US008206586B2

(12) United States Patent
Smith et al.

(10) Patent No.: US 8,206,586 B2
(45) Date of Patent: Jun. 26, 2012

(54) SYSTEMS FOR POLISHING WASTEWATER UTILIZING NATURAL MEDIA FILTRATION

(75) Inventors: John R. Smith, Pittsburgh, PA (US); Jaw Fu, Murrysville, PA (US); Rajat Ghosh, Pittsburgh, PA (US); Kevin Kitzman, Wenatchee, WA (US); Jonell Kerkhoff, Murrysville, PA (US); Robert C. Horger, New Kensington, PA (US); Dennis L. Fulmer, Greensburg, PA (US); Aniruddha Bhattachayya, Fairfax Station, VA (US); Andrew C. Middleton, Mount Sidney, VA (US); Robin L. Weightman, Murrysville, PA (US)

(73) Assignee: Alcoa Inc., Pittsburgh, PA (US)

( * ) Notice: Subject to any disclaimer, the term of this patent is extended or adjusted under 35 U.S.C. 154(b) by 432 days.

(21) Appl. No.: 11/672,762

(22) Filed: Feb. 8, 2007

(65) Prior Publication Data

US 2007/0181511 A1  Aug. 9, 2007

Related U.S. Application Data

(60) Provisional application No. 60/772,308, filed on Feb. 9, 2006.

(51) Int. Cl.
*B01D 24/02* (2006.01)
*B01D 39/06* (2006.01)
(52) U.S. Cl. .............. 210/262; 210/205; 210/502.1
(58) Field of Classification Search ............ 210/263, 210/290, 667, 719, 720, 757, 205, 502.1
See application file for complete search history.

(56) References Cited

U.S. PATENT DOCUMENTS

| 515,895 A | 3/1894 | Bayer |
| 3,575,853 A | 4/1971 | Gaughan et al. |
| 4,108,770 A | 8/1978 | Roy |
| 4,184,947 A * | 1/1980 | Demisch ............... 210/617 |
| 4,218,318 A | 8/1980 | Niimi et al. |
| 4,270,875 A | 6/1981 | Kainuma ............... 405/129.2 |
| 4,368,273 A | 1/1983 | Puskas ............... 501/155 |

(Continued)

FOREIGN PATENT DOCUMENTS

AU  661703  3/1993
(Continued)

OTHER PUBLICATIONS

Ray et al, Treatment of Urban Stormwater for Dissolved Pollutants: A Comparative Study of Natural Organic Filter media, 2005, Wiley Periodicals Inc., pp. 89-100.*

(Continued)

*Primary Examiner* — Matthew Savage
(74) *Attorney, Agent, or Firm* — Greenberg Traurig, LLP

(57) ABSTRACT

Wastewater treatment systems, methods and apparatus for polishing a wastewater stream comprising a plurality of contaminants are provided. One system includes a vessel containing a plurality of natural media filtration agents selected to remove selected ones of the plurality of contaminants from the wastewater stream. In one embodiment, the vessel includes a bed of bauxite residue and at least one other natural media filtration agent. In another embodiment, the vessel includes a bed of compost and at least one other natural media filtration agent. The vessel includes a wastewater inlet that is in fluid communication with one or more of the natural media filtration agents. The vessel includes a wastewater outlet that is in fluid communication with one or more of the natural media filtration agents.

6 Claims, 17 Drawing Sheets

U.S. PATENT DOCUMENTS

| | | | | |
|---|---|---|---|---|
| 4,519,915 | A | 5/1985 | George et al. | 210/663 |
| 4,555,992 | A | 12/1985 | Dutu et al. | 110/229 |
| 4,565,633 | A | 1/1986 | Mayenkar | |
| 4,668,485 | A | 5/1987 | Cresswell et al. | 423/119 |
| 4,810,682 | A | 3/1989 | Andrews | 501/146 |
| 5,030,424 | A | 7/1991 | Fulford et al. | 423/21.5 |
| 5,106,797 | A | 4/1992 | Allaire | 501/155 |
| 5,160,632 | A | 11/1992 | Kleefisch et al. | |
| 5,266,213 | A * | 11/1993 | Gillham | 210/747.8 |
| 5,322,629 | A * | 6/1994 | Stewart | 210/767 |
| 5,362,394 | A | 11/1994 | Blowes et al. | |
| 5,415,770 | A | 5/1995 | Heskett | |
| 5,456,553 | A | 10/1995 | Li et al. | 405/263 |
| 5,486,291 | A | 1/1996 | Todd et al. | |
| 5,487,622 | A | 1/1996 | Cherry et al. | |
| 5,534,154 | A | 7/1996 | Gillham | |
| 5,789,649 | A | 8/1998 | Batchelor et al. | |
| 5,837,145 | A | 11/1998 | Dzombak et al. | |
| 5,931,772 | A | 8/1999 | Kirkpatrick et al. | 588/256 |
| 5,975,798 | A | 11/1999 | Liskowitz et al. | |
| 6,110,377 | A | 8/2000 | Lamerant | 21/670 |
| 6,132,623 | A | 10/2000 | Nikolaidis et al. | |
| 6,207,114 | B1 | 3/2001 | Quinn et al. | |
| 6,242,663 | B1 | 6/2001 | Ponder et al. | |
| 6,248,302 | B1 | 6/2001 | Barnett et al. | 423/83 |
| 6,387,276 | B1 * | 5/2002 | Nikolaidis et al. | 210/719 |
| 6,399,359 | B1 | 6/2002 | Hofstede | |
| 6,602,421 | B2 | 8/2003 | Smith | |
| 6,689,485 | B2 | 2/2004 | Ponder et al. | |
| 6,719,902 | B1 | 4/2004 | Alvarez et al. | |
| 6,770,205 | B1 | 8/2004 | Schroder et al. | |
| 6,942,807 | B1 * | 9/2005 | Meng et al. | 210/719 |
| 7,008,964 | B2 | 3/2006 | Clausen et al. | |
| 7,037,946 | B1 | 5/2006 | Reinhart et al. | |
| 7,128,841 | B2 | 10/2006 | Zhang | |
| 7,445,717 | B2 | 11/2008 | Cha et al. | |
| 7,635,236 | B2 | 12/2009 | Zhao et al. | |
| 7,799,232 | B2 | 9/2010 | Hayashi et al. | |
| 2002/0070155 | A1 | 6/2002 | Shiota et al. | |
| 2003/0089665 | A1 | 5/2003 | Shaniuk | |
| 2003/0173306 | A1 | 9/2003 | Cha et al. | |
| 2004/0031753 | A1 | 2/2004 | Herman et al. | 210/617 |
| 2004/0040912 | A1 * | 3/2004 | McConchie et al. | 210/724 |
| 2006/0021946 | A1 | 2/2006 | Hensman et al. | |
| 2006/0249465 | A1 | 11/2006 | Jin et al. | |

FOREIGN PATENT DOCUMENTS

| | | |
|---|---|---|
| AU | 2001540105 | 1/2002 |
| EP | 0863856 | 7/2004 |
| NZ | 516305 | 4/2003 |
| WO | WO 97/28881 | 8/1997 |
| WO | WO 01/77028 | 10/2001 |
| WO | WO 2004/002605 | 1/2004 |
| WO | WO2007/092914 | 8/2007 |

OTHER PUBLICATIONS

Henricus (Harrie) Theodorus Hofstede "Use of Bauxite Refining Residue to Reduce the Mobility of Heavy Metals in Municipal Waste Compost", Doctoral Thesis presented by Henricus Theodorus Hofstede, Jan. 1994, School of Biological and Environmental Sciences, Murdoch University, Australia.
Communication Relating to the Results of the Partial International Search, PCT/US07/61821, Smith et al., pp. 1-3.
International Preliminary Report on Patentability from corresponding PCT application No. PCT/US07/61821.
Apak et al., Heavy Metal Cation Retention by Unconventional Sorbents (Red Muds and Fly Ashes), Water Research, vol. 32, No. 2, pp. 430-440 (1998).
Appendix A, Residue Workshop, (Aug. 2002).
Atun et al., A Study of Surface Properties of Red Mud by Potentiometric Method, Journal of Colloid and Interface Science, vol. 228, No. 1, pp. 40-45 (2000).
Bauxite Geology, http://www.world-aluminum.org/production/mining/geology/html.
Beveridge, S., $1.5 Billion in Reclamation Fund Untapped Despite Growing List of Abandoned Mines, Washington Observer-Reporter, pp. 1-3 (Sep. 23, 2002).
Beveridge, S., Coal Mines Fuel PA Pollution Crisis, Washington Observer-Reporter, (Sep. 23, 2002).
Beveridge, S., DEP Creates Fund to Treat Drainage at Closed LTV Sites, Washington Observer-Reporter, (Sep. 3, 2002).
Beveridge, S., DEP Orders Beth Energy Mines to Continue Water Cleanup, Washington Observer-Reporter, (Nov. 26, 2002).
Beveridge, S., Study Predicts Old Mine Water Likely to Pollute Mon River Soon, Washington Observer-Reporter, (Nov. 24, 2002).
Bowman, M., On-Site Tertiary Treatment Using Ecomax Systems, Desalination, vol. 106, pp. 305-310 (1996).
Carter, C., Summary of Metal Leachability Testwork on AWA Residues, Mercury Removal and Emissions AWA 13.14.
Cooper et al., An Investigation of Radionuclide Uptake Into Food Crops Grown in Soils Treated with Bauxite Mining Residues, Journal of Radioanalytical and Nuclear Chemistry, vol. 194, No. 2, pp. 379-387 (1995).
Doye et al., Column Leaching Test to Evaluate the Beneficial Use of Alkaline Industrial Wastes to Mitigate Acid Mine Drainage.
Elbicki et al., Evaluation of Residue and Neutralized-Residue Products for Acidic Water Treatment, Bauxite Residue Waste Acid Treatment Workshop, (Jul. 29, 2004).
Ercag et al., Furnace Smelting and Extractive Metallurgy of Red Mud: Recovery of $TiO_2$ $Al_2O_3$ and Pig Iron, Journal of Chemical Technology and Biotechnology, vol. 70, No. 3, pp. 241-246 (1997).
Fursman et al., Utilization of Red Mud Residues from Alumina production, U.S. Department of the Interior, Bureau of Mines (1970).
Kasliwal et al., Enrichment of Titanium Dioxide in Red Mud: a Kinetic Study, Hydrometallurgy, vol. 53, No. 1, pp. 73-78 (1999).
Koumanova et al., Phosphate Removal from Aqueous Solutions Using Red Mud Wasted in Bauxite Bayer's Process, Resources, Conservation and Recycling, vol. 19, No. 1, pp. 11-20 (1997).
Lopez et al., Absorbent Properties of Red Mud and Its Use for Wastewater Treatment, Water Research, vol. 32, No. 4, pp. 1314-1322 (1998).
Mahata et al., Formation of Aluminum Titanate-Mullite Composite from Bauxite Red Mud, Metallurgical and Materials Transactions B, vol. 31B, No. 3, pp. 551-553 (2000).
McConchie et al., An Environmental Assessment of the Use of Seawater to Neutralise Bauxite Refinery Wastes, Second International Symposium on Extraction and Processing for the Treatment and Minimization of Wastes, pp. 407-416 (1996).
McConchie et al., The Use of Seawater Neutralised Red Mud from Bauxite Refineries to Control Acid Mine Drainage and Heavy Metal Leachates, 14th Australian Geological Convention, Geological Society of Australia, (Jul. 1998).
McConchie et al., The Use of Seawater-Neutralised Bauxite Refinery Residues (Red Mud) in Environmental Remediation Programs, REWAS'99: Global Symposium on Recycling, Waste Treatment and Clean Technology, pp. 391-400 (1999).
McConchie et al., The Use of Seawater-Neutralised Bauxite Refinery Residues in the Management of Acid Sulphate Soils, Sulphidic Mine Tailings and Acid Mine Drainage, 3rd Queensland Environmental Conference, pp. 201-208 (2000).
Meeting on Monongahela Mine Pools, Alcoa Corporate Office, Pittsburgh, PA, (Jan. 10, 2003).
Mishra et al., Pyrometallurgical Extraction of Alumina and Iron from Red Mud, EPD Congress 2000, (2000).
Montana Mining Firms to Begin Huge Berkeley Pit Cleanup, Civil Engineering News, (Jun. 2002).
Namasivayam et al., Treatment of Dairy-Waste Water Using Waste Red Mud, Research and Industry, vol. 37, No. 3, pp. 165-167 (1992).
Pilurzu et al., New Research Proposals for Utilisation and Disposal of Bauxitic Red Mud from Bayer Process.
Pinnock et al., Assessment of Strength Development in Bayer-Process Residues, Journal of Materials Science, vol. 27, No. 2, pp. 692-696 (1992).
Pradhan et al., Adsorption of Hexavalent Chromium from Aqueous Solution by Using Activated Red Mud, Journal of Colloid and Interface Science, vol. 217, No. 1, pp. 137-141 (1999).
Pradhan et al., Adsorption of Phosphate from Aqueous Solution Using Activated Red Mud, Journal of Colloid and Interface Science, vol. 204, No. 1, pp. 169-172 (1998).
Recycling and Reuse of Basic Oxygen Furnace (BOF)/Basic Operation Process (BOP) Steelmaking Slags, STEEL Project Fact Sheet, Office of Industrial Technologies, Energy Efficiency and Renewable Energy, U.S. Department of Energy.

Roach, G.I.D., *Recovering Value from Bauxite Tailings*, Proceedings of an International Bauxite Tailings Workshop, Perth, Western Australia, pp. 409-418 (Nov. 2-6, 1992).

Skousen et al., *Overview of Acid Mine Drainage Treatment with Chemicals*, Center for Agriculture, Natural Resources and Community Development, West Virginia University Extension Services, http://www.wvu.edu/~agexten/landrec/chemtrt.htm.

Summers et al., *Bauxite Residue (Red Mud) Increases Phosphorus Retention in Sandy Soil Catchments in Western Australia*, Fertilizer Research, vol. 34, pp. 85-94 (1993).

US Filter et al., *Final Design Report—Horseshoe Bend Water Treatment Facility, Appendix B, Treatability Studies Associated with the Horseshoe Bend Water Treatment Facility*, (Dec. 2001).

Vachon et al., *Chemical and Biological Leaching of Aluminum from Red Mud*, Environmental Science and Technology, vol. 28, No. 1, pp. 26-30 (1994).

Ward et al., *Modifying Sandy Soils with the Fine Residue from Bauxite Refining to Retain Phosphorus and Increase Plant Yield*, Fertilizer Research, vol. 36, pp. 151-156 (1993).

Wong et al., *Cation Exchange Behavior of Bauxite Refining Residues from Western Australia*, Journal of Environmental Quality, vol. 24, No. 3, pp. 461-466 (1995).

Ziemkiewicz et al., of the National Mine Land Reclamation Center, *WV173 Phase II, Abandoned Mine Pool Flooding of the Pittsburgh, Ohio and Irwin Basins*, submitted to Parsons Infrastructure & Technology Group, Inc., (Feb. 2002).

Remy Albrecht, Jean Le Petit, Virgile Calvert, Gerard Terrom, Claude Perissol "Changes in the Level of Alkaline and Acid Phosphatase Activities During Green Wastes and Sewage Sludge Co-composting", Bioresource Technology 101 (2010), pp. 228-233.

J.C. Novoa-Munoz, J Simal-Gandara, D Fernnandez-Calvino, E. Lopex-Periago, M Arias Estevez "Changes in Soil Properties and in the Growth of Lolium Multiforum in an Acid Soil Amended with a Solid Waste from Wineries", Bioresource Technology 99 (2008), pp. 6771-6779.

Jenn-Hung Hsu, Shang-Lien Lo "Chemical and Spectroscopic Analysis of Organic Matter Transformations During Composting of Pig Manure", Environmental Pollution 104 (1999), pp. 89-196.

Liang Qiao and Goen Ho "The Effects of Clay Amendment on Composting of Digested Sludge", Institute for Environmental Science, Murdoch University, Murdoch 6150, Australia, pp. 1056-1064.

Shaobin Wang and Yuelian Peng "Natural Zeolites as Effective Adsorbents in Water and Wastewater Treatment", Chemical Engineering Journal 156 (2010), pp. 11-24.

Susan Tandy, John R Healey, Mark A Nason, Julie C Williamson, Davey L Jones "Remediation of Metal Polluted Mine Soil with Compost: Co-composting Versus Incorporation", Environmental Pollution 157 (2009) 690-697.

Jurate Kumpiene, Anders Lagerkvist, Christian Maurice "Stabilization of As, Cr, Cu, Pb and Zn in Soil Using Amendments—A Review", Science Direct, Waste Management 28 (2008), pp. 215-225.

LR Nissen, NW Lepp, R Edwards "Synthetic Zeolites as Amendments for Sewage Sludge-Based Compost", Chemosphere 41 (2000), pp. 265-269.

R Phillips "Use of Soil Amendments to Reduce Nitrogen, Phosphorus and Heavy Metal Availability", Journal of Soil Contamination. (1998), pp. 191-211.

Shaobin Wang, HM Ang, MO Tade "Novel Applications of Red Mud as Coagulant, Adsorbent and Catalyst for Environmentally Benign Processes", Chemosphere 72 (2008), pp. 1621-1635.

Office Action dated Apr. 14, 2011 from U.S. Appl. No. 12/837,918.

Communication relating to the results of the partial International search from PCT/US2007/061821.

Ghosh, R.S., Dzombak, D.A. and Lutty, R.G. (1999) "Equilibrium Precipitation and Dissolution of Iron Cyanide Solids in Water", Environmental Engineering Science, vol. 16, No. 4, pp. 293-313.

Meeussen, J.L., Keizer, M.G., van Rjemsdijk, W.H. and de Haan, F.A.M. (1992), "Dissolution Behavior of Iron Cyanide (Prussian Blue) in Contaminated Soils," Environmental Science Technology, vol. 26, No. 9, pp. 1832-1838.

Bang et al., "Chemical Reactions Between Arsenic and Zero-Valent Iron in Water," Water Research 39 (5): 763-770 (2005).

Ramaswami et al., "Batch-mixed Iron Treatment of High Arsenic Waters," Water Research 35(18): 4474-4479 (2001).

Sun et al., "Treatment of Groundwater Polluted by Arsenic compounds by Zero Valent Iron," Journal of Hazardous Materials 129(1-3): 297-303 (2006).

International Search Report and Written Opinion, dated Oct. 30, 2007, from corresponding PCT Application No. PCT/US2007/069016.

Durant et al., "Remediation of Perchlorate, NDMA, and Chlorinated Solvents Using Nanoscale ZVI" RTDF PRB Workshop Niagra Falls, New York, Oct. 16, 2003, pp. 1-31.

Gavaskar et al., "Design Guidance for Application of Permeable Barriers to Remediate Dissolved Chlorinated Solvents," Feb. 1997, pp. 1-192.

Lu et al., "Dechlorination of Hexachlorobenzene by Zero-Valent Iron", Pract. Periodical of Haz., Toxic, and Radioactive Waste Mgmt., vol. 8, Issue 2, Apr. 2004, pp. 136-140 (Abstract only).

Ghosh, R.S., "State of SERDP/ESTCP Funded Zero-Valent Iron (ZVI) Research and Technology, SERDP", 21 pp., retrieved from the Internet Apr. 2, 2008 at http://www.frtr.gov/pdf/meetings/k--ghosh_09jun04.pdf.

University of Cape Town, South Africa Presentation on pe-pH Diagrams, retrieved from http://web.uct.ac/za/depts/geolsci/roy/lectures/lec10.pdf in May 2006, pp. 1-15.

Zhang et al., "Removal of Selenate from Water by Zerovalent Iron", J. Environ. Qual. 34, pp. 487-495 (2005)(Abstract only).

Fu, Jie, Song, Ran, Mao, Wen-Jun, Wang, Qing, An, Shu-Qing, Zeng, Qing-Fu, Zhu, Hai-Liang, "Adsorption of Disperse Blue 2BLN by Microwave Activated Red Mud", Environmental Progress and Sustainable Energy, Dec. 2011, (vol. 30, No. 4), pp. 558-566.

Greenway, Margaret and Lucas, Bill, "Media Amendments for Enhancing Phosphorous Retention in Intermittently Loaded Vertical Flow Wetlands", Griffith University, Brisbane, Australia, Nov. 2012.

* cited by examiner

SYSTEMS FOR POLISHING WASTEWATER UTILIZING NATURAL MEDIA FILTRATION

CROSS-REFERENCE TO RELATED APPLICATION(S)

This patent application claims priority to U.S. Provisional Patent Application No. 60/772,308 filed Feb. 9, 2006, entitled "ENHANCED NATURAL MEDIA FILTRATION (NMF) WATER TREATMENT TECHNOLOGY", and is related to PCT Application No. PCT/US07/61821 filed Feb. 8, 2007, entitled "METHODS, APPARATUS AND SYSTEMS FOR POLISHING WASTEWATER UTILIZING NATURAL MEDIA FILTRATION", each of which is incorporated herein by reference in its entirety.

FIELD OF THE INVENTION

The present invention relates to methods, systems and apparatus for polishing wastewater (i.e., non-potable water) using natural filtration media, such as compost, bauxite residue, and/or iron filings, to name a few.

BACKGROUND OF THE INVENTION

Prior to discharge to the environment, wastewater must generally contain not greater than trace levels of various contaminants. To properly discharge treated water, a polishing step may be employed. Wastewater polishing generally comprises removing trace impurities from the wastewater stream prior to discharge. Conventional wastewater polishing approaches include disinfection (e.g., via chlorination/de-chlorination, UV and/or ozone) and membrane treatment, to name two. Disinfection via chlorination/de-chlorination is costly from both a consumables/labor perspective and a capital cost perspective. Furthermore, such disinfection methods are inefficient in that the chlorine must be both added to and removed from the water stream. Additionally, since chlorine gas is hazardous, it must be stored in large gas tanks, which are not only subject to stringent regulations, but are also possible terrorism targets. Similar issues arise with respect to UV, ozone and membrane treatment technologies. Consequently, there exists a need for better methods, systems and apparatus for wastewater polishing.

SUMMARY OF THE INVENTION

In view of the foregoing, a broad objective of the present invention is to provide more effective wastewater polishing methods, systems and apparatus.

Another objective is to decrease the amount of systems, and hence capital costs, associated with wastewater polishing.

A further objective is to increase the amount of environmentally friendly wastewater treatment materials and decrease the amount of hazardous or non-environmentally friendly wastewater treatment materials utilized in wastewater polishing.

Another objective is to decrease the amount of maintenance associated with wastewater polishing systems.

In addressing one or more of the above objectives, the present inventors have recognized that a plurality of natural media filtration agents may be utilized in a single bed to accomplish wastewater polishing. More particularly, a first natural media filtration agent may be utilized with a second, or even more, natural media filtration agent(s) to produce a single treatment bed capable of polishing a wastewater stream comprising a plurality of contaminants. The natural media filtration agents utilized in the bed generally include at least two of compost, bauxite residue, activated alumina, iron filings, granular activated carbon, bone char and aggregate. Multi-agent natural media filtration systems are able to reduce pass-through of contaminants via various mechanisms, such as, for example, restricted porosity, chemical adsorption, chemical precipitation, and bio-degradation, among others. For instance, the porosity of the bed may be tailored to remove small particulates (e.g., particulates having a diameter of at least about 0.5 μm) while the natural media filtration agents of the bed may be selected to increase bio-degradation, chemical adsorption and/or chemical precipitation of contaminants dissolved in the wastewater stream. Since a single bed may be employed with a plurality of natural media filtration agents, the footprint of the treatment system may be reduced relative to conventional polishing-type treatment systems. In turn, lower hydraulic loading rates may be witnessed. Furthermore, as the single treatment bed employs natural media, the bed may be utilized in a wetlands treatment approach, or a hybrid tank-wetlands approach, thereby providing a cost-effective and environmentally friendly approach to wastewater polishing.

In one aspect, a wastewater treatment system comprising a single bed for polishing a wastewater stream comprising a plurality of contaminants is provided. The treatment system comprises a vessel, a wastewater inlet to the vessel and a wastewater outlet from the vessel. In one approach, the vessel comprises a single treatment bed containing at least two natural media filtration agents. The vessel may be an in-ground pit or in-ground tank, an above-ground tank, or a combination thereof. The wastewater inlet is in fluid communication with at least one of the natural media filtration agents of the bed, and the wastewater outlet is in fluid communication with at least one of the natural media filtration agents of the bed.

The bed comprises the at least two natural media filtration agents. The natural media filtration agents may be any of compost, bauxite residue, iron filings, granular activated carbon, activated alumina, bone char and aggregate. In one embodiment, the first natural media filtration agent of the bed is compost. In another embodiment, the first natural media filtration agent of the bed is bauxite residue. In another embodiment, the first natural media filtration agent of the bed is iron filings. In another embodiment, the first natural media filtration agent of the bed is bone char. In another embodiment, the first natural media filtration agent of the bed is granular activated carbon. In another embodiment, the first natural media filtration agent of the bed is activated alumina. The second natural media filtration agent of the bed is one of compost, bauxite residue, iron filings, granular activated carbon, activated alumina, bone char, and aggregate, wherein the first natural media filtration agent is different than the second natural media filtration agent. In one embodiment, the bed comprises at least three of the natural media filtration agents. In one embodiment, the bed comprises at least four of the natural media filtration agents. In one embodiment, the bed comprises at least five of the natural media filtration agents. In one embodiment, the bed comprises at least six of the natural media filtration agents. In one embodiment, the bed comprises at least seven of the natural media filtration agents.

The plurality of natural media filtration agents may be combined in the vessel bed in various configurations. In one approach, the first and second natural media filtration agents are commingled within the vessel bed. In another approach, the bed comprises a plurality of separate filtration layers, each of which comprises at least one natural media filtration agent. In one approach, each layer comprises a single natural media filtration agent. In a particular embodiment, a layer consists essentially of a natural media filtration agent. In another approach, at least one of the layers comprises at plurality of natural media filtration agents. In one embodiment, the bed comprises a first filtration layer and a separate second filtration layer, wherein the first filtration layer comprises the first natural filtration media agent, and wherein the second filtration layer comprises the second natural media filtration agent.

In another aspect, methods of producing wastewater polishing beds adapted to polish wastewater comprising a plurality of contaminants are provided. In one approach, a method comprises the steps of (a) determining a wastewater stream profile for a wastewater stream that comprises a plurality of contaminants, the wastewater stream profile comprising a wastewater contaminant profile and at least one of a wastewater flow profile and a wastewater effluent goal; (b) selecting a plurality of natural media filtration agents for use in the wastewater polishing bed, wherein this selecting step is based at least in part on the wastewater contaminant profile, wherein a first one of the plurality of natural media filtration agents is compost or bauxite residue, and wherein a second one of the plurality of natural media filtration agents is one of compost, bauxite residue, granular activated carbon, iron filings, bone char and aggregate, the second one of the plurality of natural media filtration agents being different than the first one of the natural media filtration agents; (c) selecting a single bed configuration based at least in part on the first and second natural media filtration agents, and further based in part on at least one of the wastewater flow profile and the wastewater effluent goal; and (d) producing a single treatment bed comprising the plurality of natural media filtration agents based at least in part on the single bed configuration.

In one embodiment, the wastewater contaminant profile indicates the presence of at least one of aluminum, chlorine, atrazine, and bioaccumulative organics (e.g., PCBs, PAHs), and a selected natural media filtration agent is compost. In one embodiment, the wastewater contaminant profile indicates the presence of at least one of fluorides, nitrates, pathogens, phosphates and arsenic, and a selected natural media filtration agent is bauxite residue. In one embodiment, the wastewater contaminant profile indicates the presence of at least one of arsenic, cyanide, chromium, pathogens, and selenium, and a selected natural media filtration agent is iron filings. In one embodiment, the iron filings comprise zero valent iron. In one embodiment, the wastewater contaminant profile indicates the presence of at least one of chlorine, polychlorinated biphenyls, and polynuclear aromatic hydrocarbons, and a selected natural media filtration agent is granular activated carbon. In one embodiment, the wastewater contaminant profile indicates the presence of at least one of arsenic, fluoride and lead, and a selected natural media filtration agent is bone char.

In one embodiment, the selecting a plurality of natural media filtration agents step comprises selecting at least three natural media filtration agents for use in the wastewater polishing bed. In one embodiment, the selecting a plurality of natural media filtration agents step comprises selecting at least four natural media filtration agents for use in the wastewater polishing bed. In one embodiment, the selecting a plurality of natural media filtration agents step comprises selecting at least five natural media filtration agents for use in the wastewater polishing bed. In one embodiment, the selecting a plurality of natural media filtration agents step comprises selecting at least six natural media filtration agents for use in the wastewater polishing bed. In one embodiment, the selecting a plurality of natural media filtration agents step comprises selecting at least seven natural media filtration agents for use in the wastewater polishing bed. In one embodiment, a first one of the plurality of natural media filtration agents is compost, a second one of the plurality of natural media filtration agents is bauxite residue, and a third one of the plurality of natural media filtration agents is one of granular activated carbon, iron filings, bone char, activated alumina, and aggregate.

In one aspect, methods of polishing wastewater utilizing the wastewater polishing systems are provided. In one embodiment, after the single bed is produced, such as described above, a method includes the steps of flowing the wastewater stream through the single treatment bed comprising the first and second natural media filtration agents; removing at least a portion of a first contaminant of the wastewater stream via the first one of the natural media filtration agents; and removing at least a portion of a second contaminant of the wastewater stream via the second one of the natural media filtration agents. In one embodiment, the method includes the step of discharging, after the flowing step, a discharge water stream from the single treatment bed, wherein the discharge water stream comprises not greater than legally allowed limits of the first and second contaminants.

As may be appreciated, various ones of these inventive aspects, approaches and embodiments may be combined to yield various wastewater polishing systems having a single bed for polishing a wastewater, and methods associated therewith. These and other aspects, advantages, and novel features of the invention are set forth in part in the description that follows and will become apparent to those skilled in the art upon examination of the following description and figures, or may be learned by practicing the invention.

DETAILED DESCRIPTION OF THE INVENTION

Figure 1A:
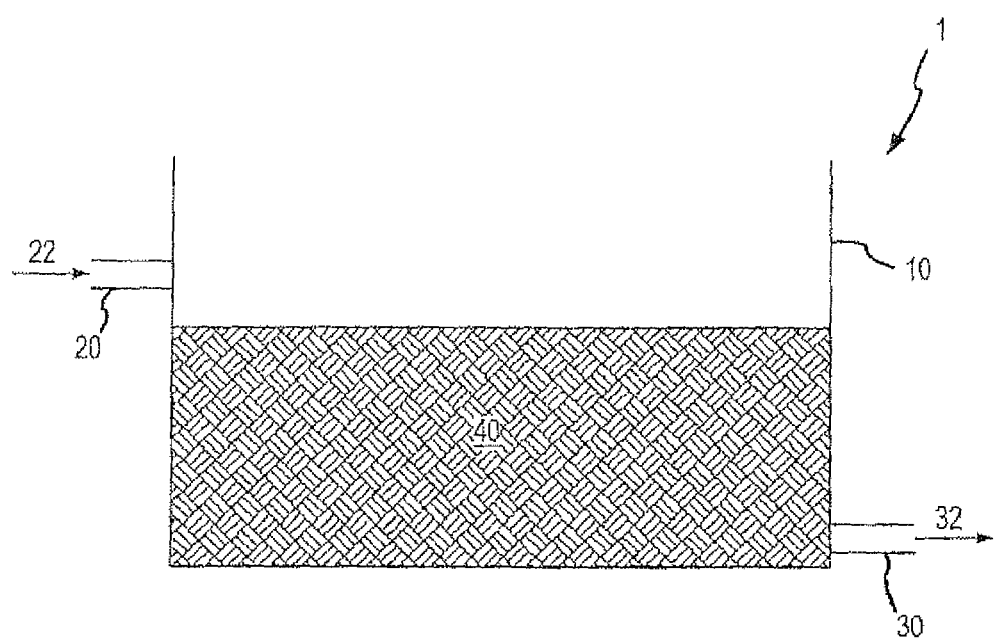
FIG. 1A illustrates one embodiment of a wastewater polishing system useful in accordance with the present invention.
Figure 1B:
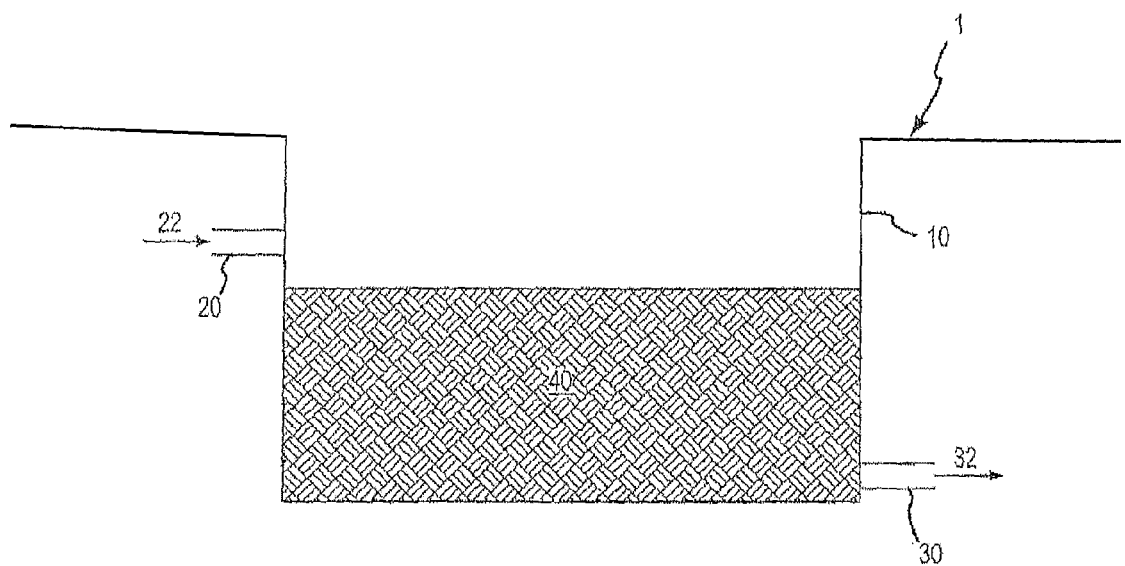
FIG. 1B illustrates one embodiment of a wastewater polishing system useful in accordance with the present invention in which the vessel is in the form of an in-ground pit.
Figure 1C:
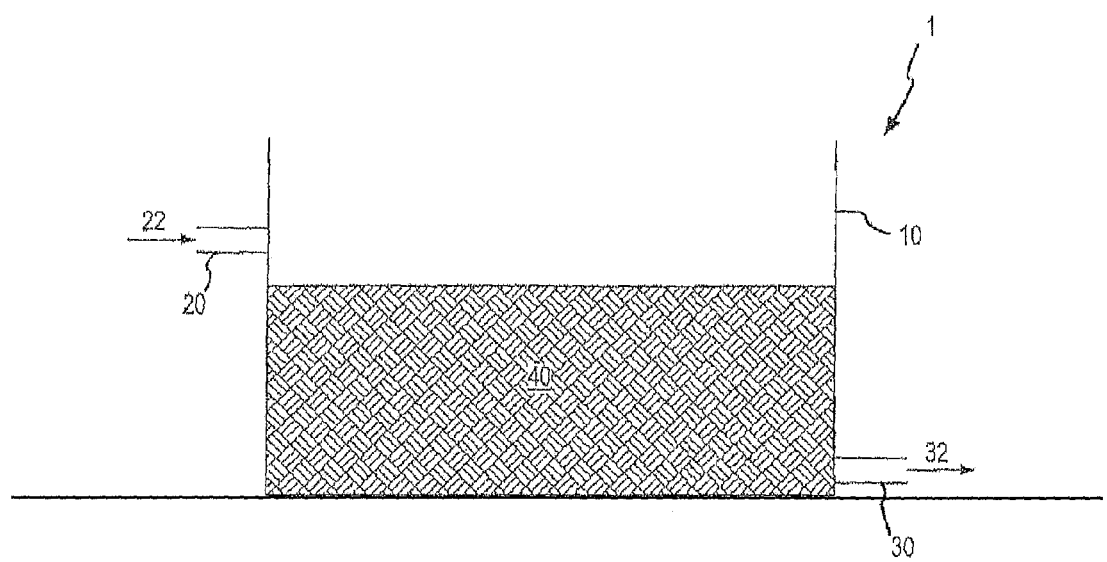
FIG. 1C illustrates one embodiment of a wastewater polishing system useful in accordance with the present invention in which the vessel is in the form of an above-ground tank.
Figure 1D:
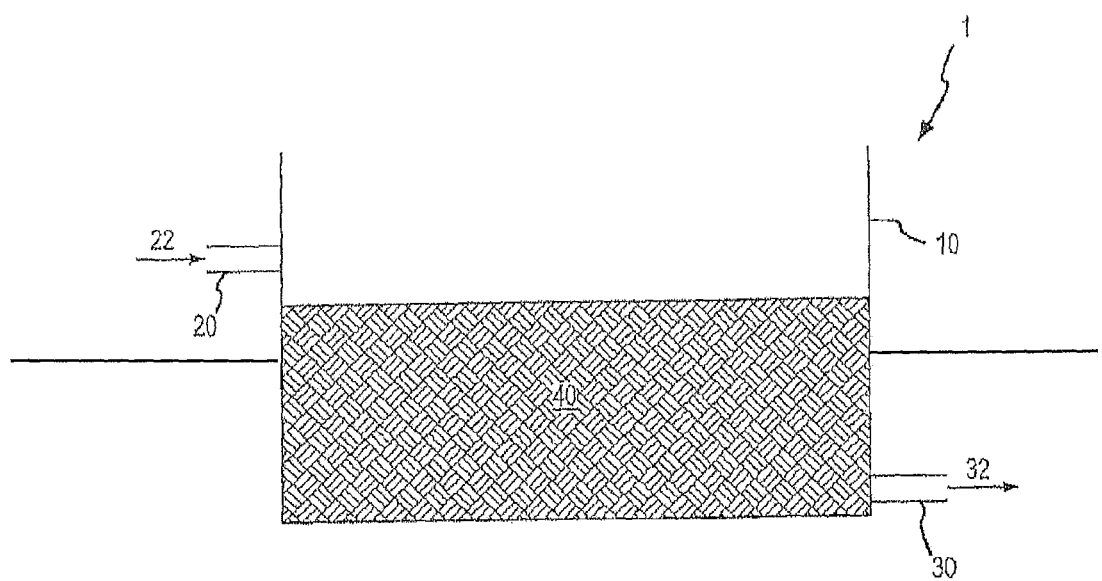
FIG. 1D illustrates one embodiment of a wastewater polishing system useful in accordance with the present invention in which the vessel is in the form of a combined in-ground pit and above-ground tank.

Reference will now be made in detail to the accompanying drawings, which at least assist in illustrating various pertinent features of the present invention. Referring now to FIG. 1, one embodiment of a wastewater polishing system is illustrated. The wastewater polishing system 1 includes a vessel 10 comprising an inlet 20 and an outlet 30. The vessel 10 also includes a bed 40 comprising a plurality of natural media filtration agents that are adapted to remove impurities, contaminants, and/or particulates and the like from a wastewater stream 22 (i.e., a non-potable water stream) passing through the bed 40. Thus, a water stream 32 exiting the vessel 10 via outlet 30 will contain a reduced amount of contaminants/ impurities.

The bed 40 comprises at least two natural media filtration agents, and those agents are selected based on the contaminants in the wastewater stream. More particularly, the bed 40 comprises at least two of the following natural media filtration agents: compost, bauxite residue, activated alumina, granular activated carbon, iron filings, bone char, and aggregate. Natural media filtration agents are environmentally friendly agents that remove contaminants from wastewater via physical, chemical and/or biological processes (e.g., absorption, adsorption, entrainment, precipitation, bio-degradation) as the wastewater communicates with (e.g., passes by/flows through) the agent(s). The amount and type of natural media filtration agents is selected based on the contaminant profile of the wastewater stream 22 and/or suitable contaminant levels of the exiting water stream 32.

Table 1, below, provides a listing of various contaminants and natural media filtration agents that may be useful for removing those contaminants from the wastewater stream. For example, for wastewaters comprising polychlorinated biphenyls (PCBs), the bed 40 may include compost and/or granular activated carbon (GAC). For wastewaters that comprise fluorides, the bed 40 may comprise bauxite residue, bone char and/or activated alumina. Many other contaminants and natural media filtration agent combinations may be employed, some of which are discussed in further detail below. The examples of Table 1 are non-limiting and are for illustration purposes only as other non-listed contaminants may be contained within the wastewater stream 22, and one or more of the natural media filtration agents may be employed to remove such contaminants from the wastewater stream 22.

TABLE 1

| Contaminant | Suitable removal agent(s) |
| --- | --- |
| Aluminum | compost |
| Arsenic | activated alumina, bauxite residue, bone char, iron filings |
| Chlorine | compost, granular activated carbon |
| Chromium | iron filings |
| Cyanides | iron filings |
| Fluorides | activated alumina, bauxite residue, bone char |
| Herbicides/Pesticides | compost, bauxite residue |
| Lead | bone char |
| Nitrogen (e.g., nitrates) | bauxite residue |
| PAHs | bauxite residue, compost, granular activated carbon |
| Pathogens | bauxite residue, iron filings |
| PCBs | compost, granular activated carbon |
| Phosphorous (e.g., phosphates) | bauxite residue |
| Selenium | activated alumina, iron filings |

As noted above, compost is useful in removing/filtering, for example, various organic chemicals (e.g., bioaccumulative organics, such as PCBs and PAHs) metals, halogens, and inorganic chemicals (e.g., atrazine) to name a few. Compost may also be useful in acting as a filler material, which provides structural support for the bed 40 and/or assists in tailoring the porosity of the bed 40 so as to facilitate a suitable residence time (also known as hydraulic retention time). The compost may be obtained from any suitable source, such as by aerobically decomposing plant(s) and/or animal(s). One particularly useful compost is mushroom-containing compost. The compost may be in accordance with United States EPA Class A or Class B standards (see 40 C.F.R. §503). Thus, compost may be employed in the bed 40 as one or both of a filtering/reaction material and as a filler material since compost is relatively inexpensive, is widely available, and generally has a suitable structural integrity to act as a filler material. Compost is generally employed in the bed 40 with at least one other natural media filtration agent.

Bauxite residue is useful in removing, for example, pathogens (e.g., bacteria and/or viruses, such as coliform bacteria), arsenic, eutrophication nutrients (e.g., nitrogen or phosphorous containing nutrients, such as nitrates and phosphates), and herbicides/pesticides, to name a few. Bauxite residue (also known as red mud or brown mud) is a by-product of the Bayer Process (i.e., the process of producing alumina from bauxite). The chemical and physical properties of bauxite residue depend primary on the type of bauxite used in the Bayer Process and, to a lesser extent, the manner in which the bauxite is processed. Bauxite residue generally contains alumina, silica and iron oxide. Bauxite residue is relatively inexpensive (e.g., about $50 per ton) and is thus preferred over more expensive natural filtration media suitable for removal of similar contaminants (e.g., activated alumina, iron filings). Bauxite residue is generally employed in the bed 40 as a filtering/reaction material and is generally utilized within the bed 40 with, at least, compost and/or aggregate. However, in some instances, bauxite residue may be utilized without other natural media filtration agents and/or may be employed as a filler material.

Activated alumina is useful in removing/filtering, for example, arsenic, fluorides, and selenium. Activated alumina is generally obtained by dehydroxylating aluminium hydroxide and is available from a variety of world wide merchants. Thus, activated alumina may be employed in the bed 40 as one or both of a filtering/reaction material, and is generally utilized in the bed 40 with at least one other natural media filtration agent. However, in some instances, activated alumina may be utilized without other natural media filtration agents and/or may be employed as a filler material.

Granular activated carbon is useful in removing/filtering, for example, various organic chemicals (e.g., PCBs, PAHs). The granular activated carbon may be any suitable activated carbon in particulate form. For example, the activated carbon may be obtained from charcoal or coal. Granular activated carbon is generally employed in the bed 40 as a filtering/ reaction material and is generally utilized within the bed 40 with, at least, compost and/or aggregate. However, in some instances, granular activated carbon may be utilized without other natural media filtration agents and/or may be employed as a filler material.

Iron filings are useful in removing/filtering, for example, various pathogens, cyanide complexes, chromium, selenium and arsenic, to name a few. Iron filings generally comprise zero valent iron (ZVI), but may include other types of iron. Iron filings are generally employed in the bed 40 as a reaction material. Iron filings are relatively more expensive than other natural filtration media, and are thus less preferred in some instances. Iron filings are generally in particulate or ribbon form and are generally utilized within the bed 40 with, at least, compost and/or aggregate. However, in some instances, iron filings may be utilized without other natural media filtration agents and/or may be employed as a filler material.

Bone char is useful in removing/filtering, for example, fluorides, arsenic, and lead. Bone char, also known as bone black or animal charcoal, generally comprises carbon and calcium phosphate and is produced from calcining animal bones. Bone char is generally employed in the bed as a filtering/reaction material and is generally utilized within the bed 40 with, at least, compost and/or aggregate. However, in some instances, bone char may be utilized without other natural media filtration agents and/or may be employed as a filler material.

Aggregate is useful in filtering materials entrained within the wastewater (e.g., total suspended solids). Aggregate generally comprises sand and/or gravel. Aggregate is also useful in acting as a structural support for the bed 40 and/or in tailoring the porosity of the bed 40 to facilitate a suitable residence time. Aggregate is generally employed within the bed 40 as a filtering material and is generally employed with at least one of, and typically at least two of, compost, bauxite residue, activated alumina, iron filings, granular activated carbon and bone char.

The above-described natural media filtration agents may be combined in any ratio(s) and/or amount(s) to treat the wastewater stream 22 via bed 40. These combinations and ratios are generally application specific. In one embodiment, the wastewater stream 22 may comprise coliform bacteria and the bed 40 may comprise bauxite residue and aggregate to treat the coliform bacteria. In this embodiment, the bauxite residue to aggregate ratio may be at least about 2:1, such as at least about 3:1, or at least about 5:1, by volume. In this embodiment, the bauxite residue to aggregate ratio may be not greater than 10:1. In other embodiments, bauxite residue may be employed as a layer of the bed 40, where this layer is comprised mainly of, and in some instances consists essentially of, bauxite residue.

In another embodiment, the wastewater stream may comprise cyanide, and the bed 40 may comprise iron filings and aggregate to treat the cyanide. In this embodiment, the iron filings to aggregate ratio may be at least about 1:5, such as at least about 1:1, by volume.

The natural media filtration agents may be utilized within the bed 40 in any arrangement that facilitates removal of contaminants from the wastewater while allowing a suitable residence time of the water. For example, and as illustrated in FIG. 1, the natural media filtration agents may be commingled as a single bed layer.

Figure 2:
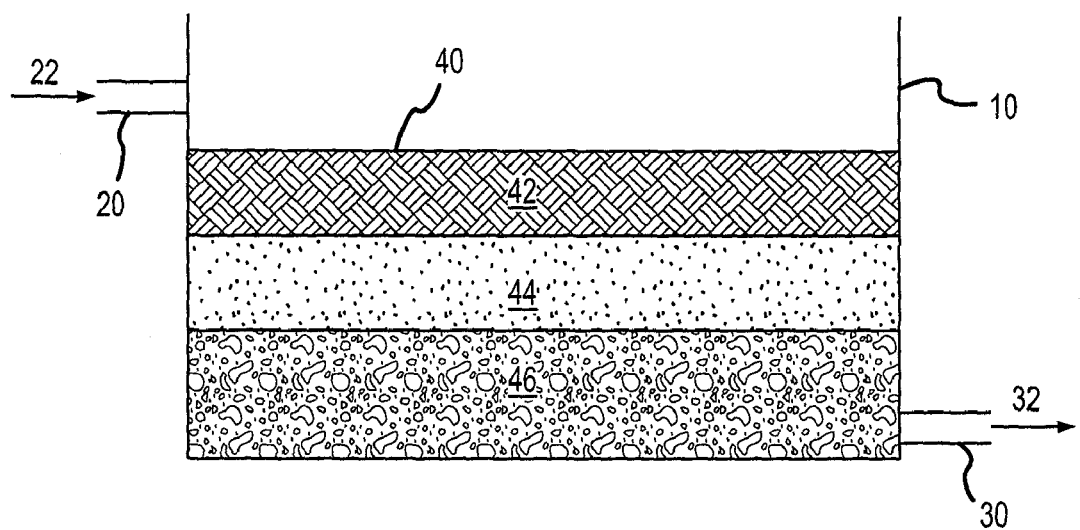
FIG. 2 illustrates another embodiment of a wastewater polishing system useful in accordance with the present invention.

In another embodiment, and as illustrated in FIG. 2, the bed 40 may comprise a plurality of distinct layers, each of which may comprise one or more of the natural media filtration agents. By way of illustration, a first layer 42 may comprise a first natural media filtration agent (e.g., compost), a second layer 44 may comprise a mixture of second and third natural media filtration agents (e.g., iron filings and aggregate), and a third layer 46 may comprise a mixture of fourth and fifth natural media filtration agents (e.g., bauxite residue and aggregate). Thus, the bed 40 may comprise a plurality of filtering layers that may be tailored to remove one or more contaminants from the wastewater, each of the plurality of layers including at least one natural media filtration agent. One or more of these plurality of layers may also be tailored to facilitate a suitable residence time by tailoring the porosity of the layer via one or more of the natural media filtration agents.

The amount of each natural media filtration agent utilized in the bed is application specific and is a function of, for example, wastewater contaminant levels, effluent goals, and wastewater flow rates, to name a few. General, non-limiting guidelines regarding amounts of natural media filtration agents that may be used per contaminant are provided in Table 2, below.

TABLE 2

| Contaminant | Suitable removal agent(s) | Empty Bed Contact Time (minutes) | Surface Loading Rate (lpm/m$^2$) |
|---|---|---|---|
| Aluminum | compost | 50-1600 | 1.2-12.2 |
| Arsenic | bauxite residue, activated alumina, iron filings | 5-10 | 20.3-40.7 |
| Chlorine | compost, granular activated carbon | ~60 | ~16.3 |
| Cyanides | iron filings | 20-100 | 6.1-11.4 |
| Fluorides | bauxite residue, bone char, activated alumina | ~100 | ~4.1 |
| Pathogens | bauxite residue, iron filings | 50-90 | 8.1-20.3 |
| PCBs | compost, granular activated carbon | 50-1600 | 1.2-12.2 |
| Phosphorous | bauxite residue | 40-90 | 8.1-20.3 |
| Selenium | iron filings, activated alumina | 5-10 | 20.3-40.7 |
| Others | misc. | 5-1600 | 0.5-40.7 |

The vessel 10 may be any suitable container adapted to contain the bed 40 and interface with the inlet 20 and the outlet 30. In one embodiment, the vessel 10 is an in-ground pit utilized in a wetlands treatment arrangement. Other configurations may also be employed, such as in-ground or above-ground columns and tanks, and hybrids of any of these, such as a vessel that includes both an in-ground pit and a tank interconnected therewith, to name a few. The vessel 10 holds the bed 40; both should be configured to facilitate removal of a desired amount of contaminants from the wastewater stream 22 (e.g., so as to produce an exiting water stream 32 that is in accordance with local laws/regulations). Thus, the size of the bed 40, and thus the vessel 10, is generally application specific, and is generally based on one or more of the residence time of the water within the bed 40, the bed materials utilized within the bed 40, such as the natural media filtration agents utilized within the bed 40, the concentration of natural media filtration agents within the bed 40, and the filtration/reaction rates of the natural media filtration agents of the bed 40.

As noted, since the system 1 is a polishing type system its configuration is generally applicable to low flow treatment arrangements. In this regard, the bed 40 and/or vessel 10 may be configured to facilitate a suitable hydraulic loading rate and/or residence time. For example, the bed and/or vessel may be configured to have a hydraulic loading rate of not greater than 1 gallon per minute per square foot (40.7 liters per minute per square meter), such as not greater than 0.1 gallon per minute per square foot ((4.1 liters per minute per square meter). In one embodiment, the hydraulic loading rate is at least 0.01 gallon per minute per square foot (0.4 liters per minute per square meter). In one embodiment, the residence time is at least 2 hours, such as at least 8 hours. In one embodiment, the residence time is not greater than 48 hours, such as not greater than 24 hours.

Since the vessel 10 and bed 40 may be sized to facilitate removal of contaminants to a suitable level, the water stream 32 exiting the vessel 10 will generally comprise a contaminant level that is less than a pre-determined standard. This standard may be one or more of an international, national, state, provincial, county and/or municipal law/regulation/guideline, and the exiting water stream 32 may contain contaminant levels that are in accordance with one or more of those standards. For instance, the water stream 32 may contain not greater than legally permitted levels of, in no particular order, PCBs, chlorines, fluorides, polynuclear aromatic hydrocarbons (PAHs), bacteria, viruses, herbicides, pesticides, eutrophication nutrients (e.g., nitrates, phosphates), arsenic, cyanides, metals (e.g., Al, Cr, Pb), and/or selenium. In some embodiments, the exiting water stream 32 may comprises non-detectable levels of contaminants, such as low ppt levels of various contaminants. Thus, the exiting water stream 32 may be suitable for discharge to the environment, such as via groundwater injection.

As noted above, a vessel inlet 20 is utilized to provide the wastewater stream 22 to the vessel 10. The vessel inlet 20 may be any suitable type of apparatus that facilitates fluid communication between the wastewater stream 22 and the bed 40, such as pipes, sieves and the like. As noted above, since the system 1 is generally suitable for polishing wastewater, as opposed to treating heavy polluted wastewaters, the wastewater stream 22 entering the vessel 10 generally should comprise contaminant levels that are suitable for treatment via a polishing-type system. Furthermore, the wastewater stream should be amenable to low-flow treatment systems, such as via the residence times and/or hydraulic loading rates provided above. With respect to contaminant levels, the maximum permitted contaminant level of the wastewater stream 22 is application specific and is a function of, for instance, the types and amounts of contaminants within the wastewater stream 22, as well as the desired vessel 10 volume and desired lifetime of the system 1, to name a few. In one approach, the wastewater stream 22 should may include not greater than about 100 mg/L of contaminants, such as, for example, part-per-billion (ppb) and/or part-per-trillion (ppt) levels of contaminants. Some examples of types of wastewaters that may be polished using the system 1 include sanitary sewage effluents after activated sludge treatment, industrial cooling waters, industrial wastewaters, combined sewer overflow, and storm runoff, to name a few.

As noted above, the vessel outlet 30 is utilized to discharge the exiting water stream 32. Any suitable apparatus may be utilized as the vessel outlet 30. For example, any suitable type of piping/sieve may be utilized. The vessel inlet 20 and outlet 30 are generally positioned relative to one another to facilitate a suitable residence time of contaminated water within the vessel 10. Thus, the inlet 20 may be positioned above, proximal, transverse to or otherwise next to the bed 40, or a layer thereof (e.g., a top layer). Likewise, the outlet may be positioned below, proximal, transverse or otherwise next to the bed 40, or a layer thereof (e.g., a bottom layer).

Figure 3:
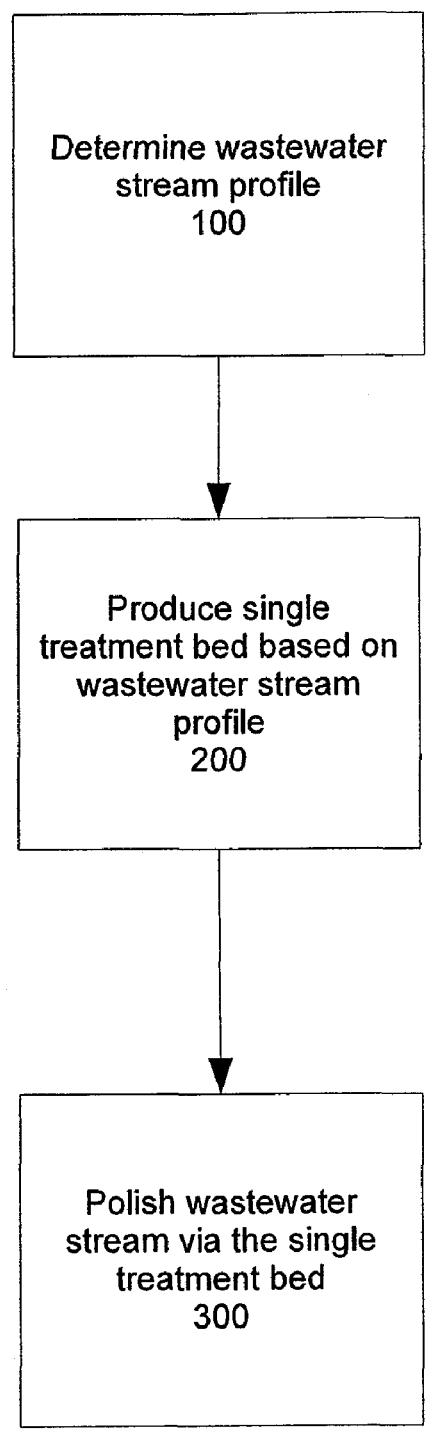
FIG. 3 is a flow chart illustrating one embodiment of a method for producing a single treatment bed and polishing a wastewater stream via a single treatment bed.

Methods of producing wastewater treatment beds and methods of polishing/treating wastewater streams via the single wastewater treatment beds are also provided. One embodiment of a method for producing a wastewater treatment bed is illustrated in FIG. 3. In the illustrated embodiment, the method includes the steps of determining a wastewater stream profile 100 and producing a single treatment bed based on the wastewater stream profile 200. The method may also include the step of treating a wastewater stream via the produced single wastewater treatment bed 300.

Figure 4:
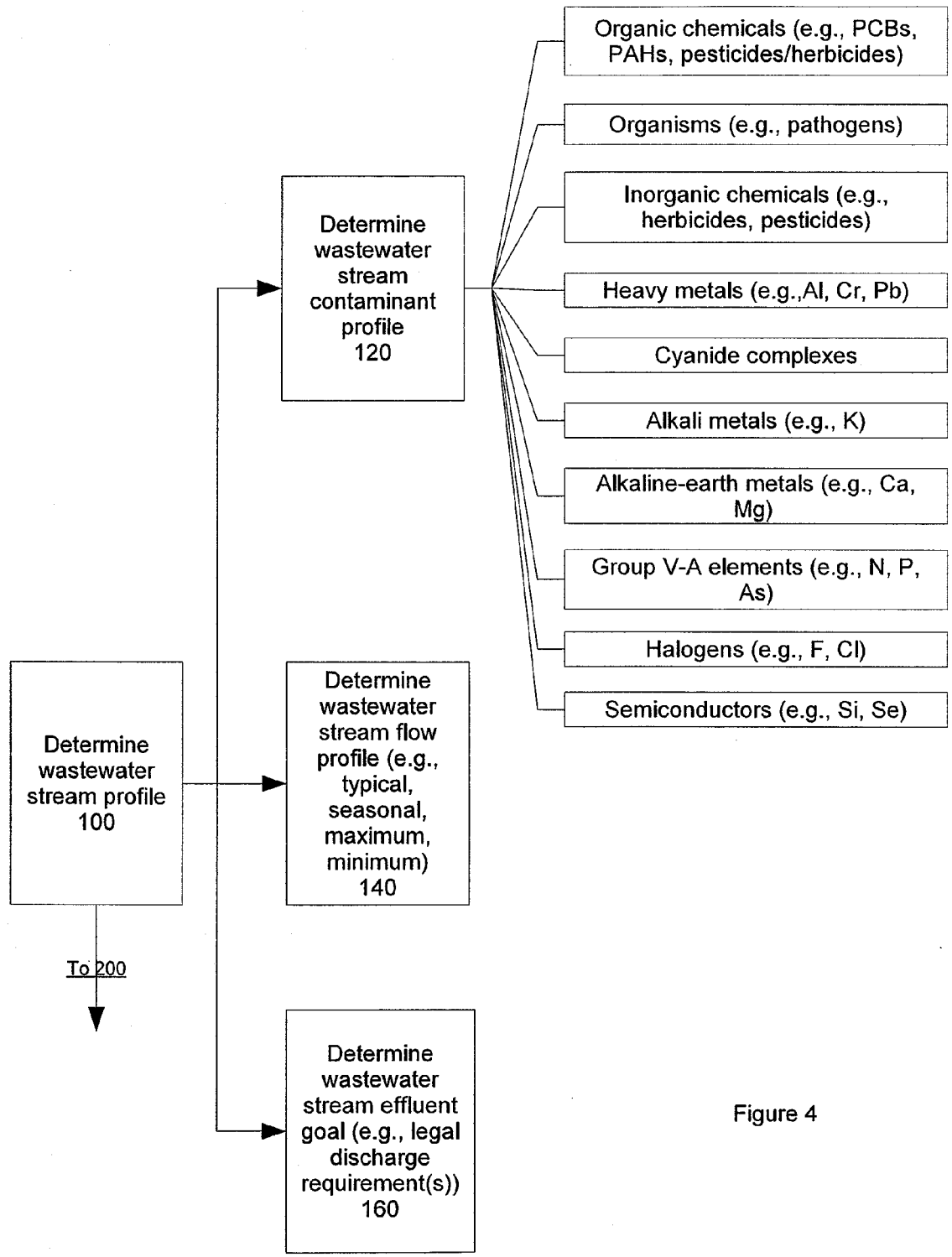
FIG. 4 is a flow chart illustrating various steps that may be completed to determine a wastewater stream profile.

Referring now to FIG. 4, the step of determining a wastewater stream profile 100 may include one or more of, and often at least two of, or even all of, the steps of determining a wastewater stream contaminant profile 120, determining a wastewater stream flow profile 140 and determining a wastewater stream effluent goal 160.

The step of determining a wastewater contaminant profile 120 may be completed by various known techniques, such as sampling and analysis. This step 120 is important to determine the types and quantities of the contaminants in the wastewater stream, which facilitates selection of the natural media filtration agents and the amounts of those natural media filtration agents to be utilized within the system. For example, as described above, the wastewater stream may currently contain, or may be anticipated to contain at a later date, organic chemicals, organisms, inorganic chemicals, heavy metals, cyanide complexes, alkali metals, alkaline-earth metals, group V-A elements, halogens and/or semiconductors, to name a few. A plurality of the natural media filtration agents may be selected based on the wastewater contaminant profile, such as in accordance with Table 1, above.

The step of determining a wastewater stream flow profile 140 may be completed by various known techniques, such as by modeling and/or physical measurement. The flow profile may include wastewater flow information such as average flow rate, seasonal flow rates, maximum flow rates, and minimum flow rates, to name a few. This information may be useful in facilitating sizing of the bed and/or vessel of the treatment system and/or selection of the natural media filtration agents. For example, a residence time and/or hydraulic loading rate of the vessel/bed may be determined utilizing flow profile information.

The step of determining a wastewater stream effluent goal 160 generally comprises determining the amounts of contaminants that are acceptable for discharge from the treatment system. For example, various standards, such as those described above, may be utilized to determine the wastewater effluent goal. This information may be useful in facilitating sizing of the bed and/or vessel of the treatment system and/or selection of the natural media filtration agents. For example, a residence time and/or hydraulic loading rate of the vessel/bed may be determined utilizing effluent goal information.

Figure 5:
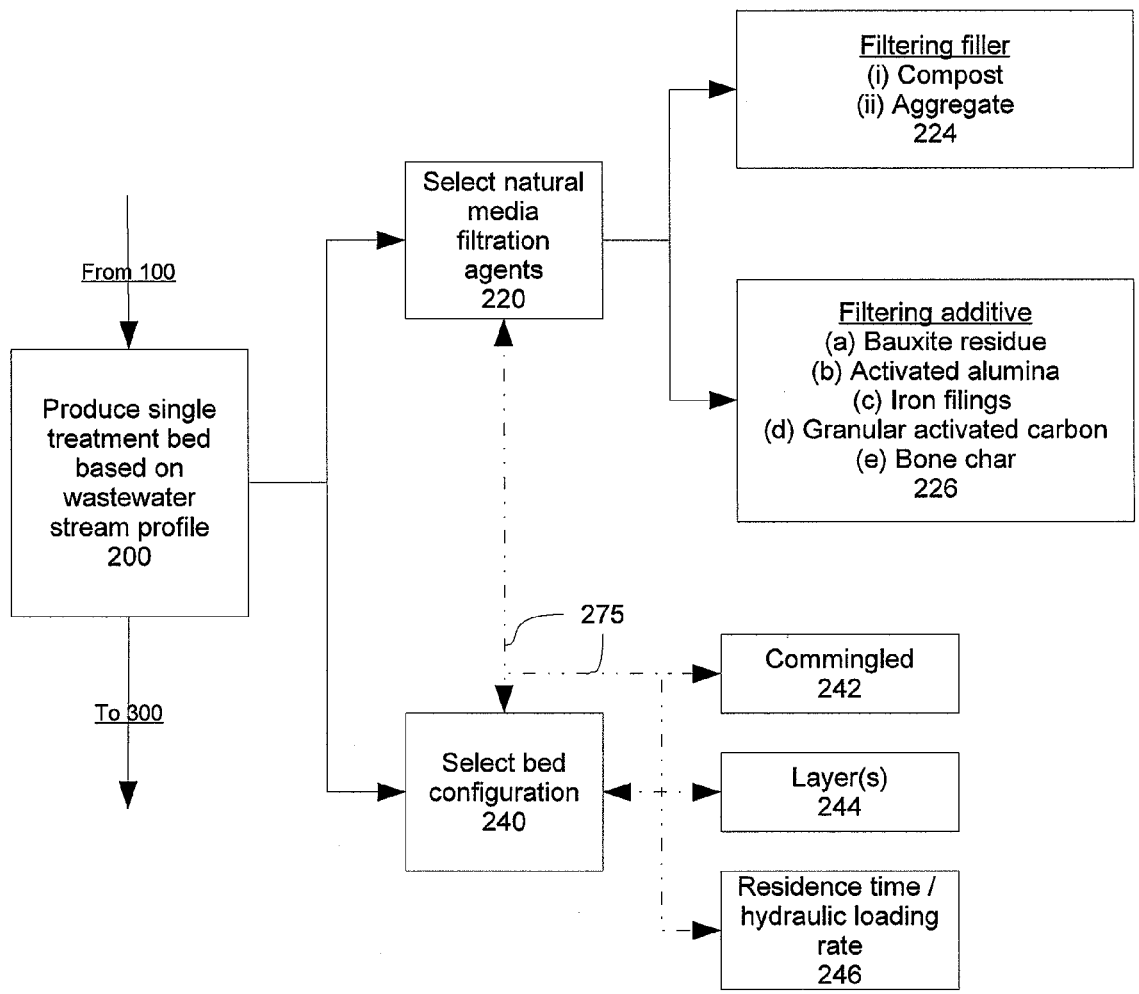
FIG. 5 is a flow chart illustrating various steps that may be completed to produce a single treatment bed.

Referring now to FIG. 5, once the wastewater stream profile has been determined 100, the single treatment bed may be produced 200. The step of producing the single treatment bed may include the step of selecting a plurality of natural media filtration agents for the bed/system 220 and selecting a configuration of the single treatment bed 240.

The selected media step 220 may be based on, for example, the wastewater contaminant profile 120, where suitable natural media filtration agents are selected to remove contaminants of the wastewater stream. For example, a first natural media filtration agent may be selected based on a first contaminant of the wastewater stream and a second natural media filtration agent may be selected based on a second contaminant of the wastewater stream, where the first natural media filtration agent is effective in removing the first contaminant from the wastewater stream and the second natural media filtration agent is effective in removing the second contaminant from the wastewater stream. Furthermore, the first and/or second natural media filtration agents may be effective in removing other contaminants from the wastewater stream. Thus, the bed may comprise, and in some instances consist essentially of, the first and second natural media filtration agents in commingled or layered configuration. Nonetheless, third, fourth, fifth, sixth and seventh natural media filtration agents may also be selected to remove third, fourth, fifth, sixth and/or additional contaminants, respectively, from the wastewater stream. Thus, the bed may comprise three, four, five, six or even seven natural media filtration agents, in commingled and/or layered configuration, and in some embodiments may consist essentially of those three, four, five, six or seven natural media filtration agents, respectively.

Irrespective of the contaminants of the wastewater stream, the bed should include at least one of a filtering filler material and should also include one of a filtering additive. In one embodiment, the filtering filler material is at least one of compost and aggregate, as illustrated in box 224. In a related embodiment, the filtering additive is at least one of bauxite residue, activated alumina, iron fillings, granular activated carbon and bone char, as illustrated in box 226. The filtering filler generally acts as a structural support for the bed, and also provides a mechanism to create layered and/or commingled configurations within the bed, while the filtering additive is an additive that is generally employed with a filtering filler, and acts to physically, chemically and/or biologically interact with contaminants of the wastewater stream to remove those contaminants from the wastewater stream. In some instances, the filtering filler material may also to chemically and/or biologically interact with contaminants of the wastewater stream to remove those contaminants from the wastewater stream, such as via the use of compost. Generally, the filtering filler materials are less expensive than the filtering additives and are thus employed as a filler, although in some instances the filtering additives may be utilized as fillers. By way of illustration, compost may be mixed with bauxite residue to produce a commingled single layered bed. In another example, the bed may comprise a first layer of compost material and a separate second layer comprising bauxite residue commingled with aggregate. Thus, in this example, the compost acts as both a filtering filler material and a filtering additive for the first layer, and the aggregate acts as a filtering filler for the second layer. In turn, the bauxite residue acts as a filtering additive for the second layer being commingled with the aggregate. Other configurations are possible, and include any of the permutations and combinations of the listed filtering fillers and filtering additives.

The natural filtration media agents may also be selected based on the porosity/retention capability of the natural media filtration agent, and hence the step of selecting the natural media filtration agents 220 may be based on one or more of the flow profile information and/or the effluent goal information of the wastewater stream. For example, natural media filtration agents may be selected to achieve a suitable residence time/hydraulic loading rate within the bed/system, which is related to the porosity/retention capability of the natural media filtration agents. The configuration of the bed, discussed below, may also be used to facilitate a suitable residence time/hydraulic loading rate within the bed/system.

As noted above, the step of producing the single treatment bed generally involves the step of selecting a configuration of the single treatment bed 240. For instance, one or more of a commingled 242 or layered 244 configuration may be selected. The selected configuration may be based on one or more of the wastewater stream contaminant profile 120, the wastewater stream flow profile 140, the wastewater stream effluent goal 160, and the selected natural media filtration agents 220. By way of illustration, the bed may be configured to facilitate a suitable residence time/hydraulic loading rate 246 as based on the selected natural media filtration agents, wherein various ones of the natural media filtration agents are layered and/or commingled to achieve the a suitable residence time/hydraulic loading rate. The configuration may allow for flow gradients within the bed so as to facilitate the residence time. The configuration may also allow for sizing of the bed to achieve a desired bed lifetime. The configuration may be restricted based on the volume available for the vessel, and thus the step of selecting a configuration and the step of selecting the natural media filtration agents may be interrelated, as illustrated by arrows 275, to achieve the effluent goal within the available volume.

After the natural media filtration agents and the configuration have been selected, the bed may be produced 200, such as via production of an in-ground pit, followed by insertion of the natural filtration media filtration agents into the pit. If a layered configuration is utilized, the natural filtration media for the layer may be produced (e.g., via mixing of the selected natural media filtration agents for that layer), followed by production of the layer within the pit (e.g., via dumping and/or leveling). Concomitantly, the inlets and/or outlets of the pit may be produced and interconnected with suitable piping/sieves. Since the bed is comprised mainly of natural media filtration agents and comprises a tailored porosity, the bed will require little maintenance, is environmentally friendly, and may have a long lifetime (e.g., 20-30 years). Furthermore, the use of natural filtration media may be relatively inexpensive. System replacement costs may thus be relatively inexpensive, and therefore infrequent bed replacement may not be overly burdensome.

Referring back to FIG. 3, after the single treatment bed has been produced, the wastewater stream may be polished utilizing the single treatment bed 300. For example, the wastewater stream may flow through the single treatment bed wherein contaminant levels of the wastewater stream are reduced such that the wastewater stream may be discharged in compliance with one or more federal, state and/or local laws. More particularly, at least a first portion of a first contaminant may be removed from the wastewater stream via a first one of the natural media filtration agents. A second contaminant of the wastewater stream may be removed by a second one of the natural media filtration agents. Other contaminants may also be removed via the plurality of natural media filtering agents. The exiting water stream may thus be discharged to the environment.

EXAMPLES

Bauxite Residue and Iron Filings Columns

Figure 6:
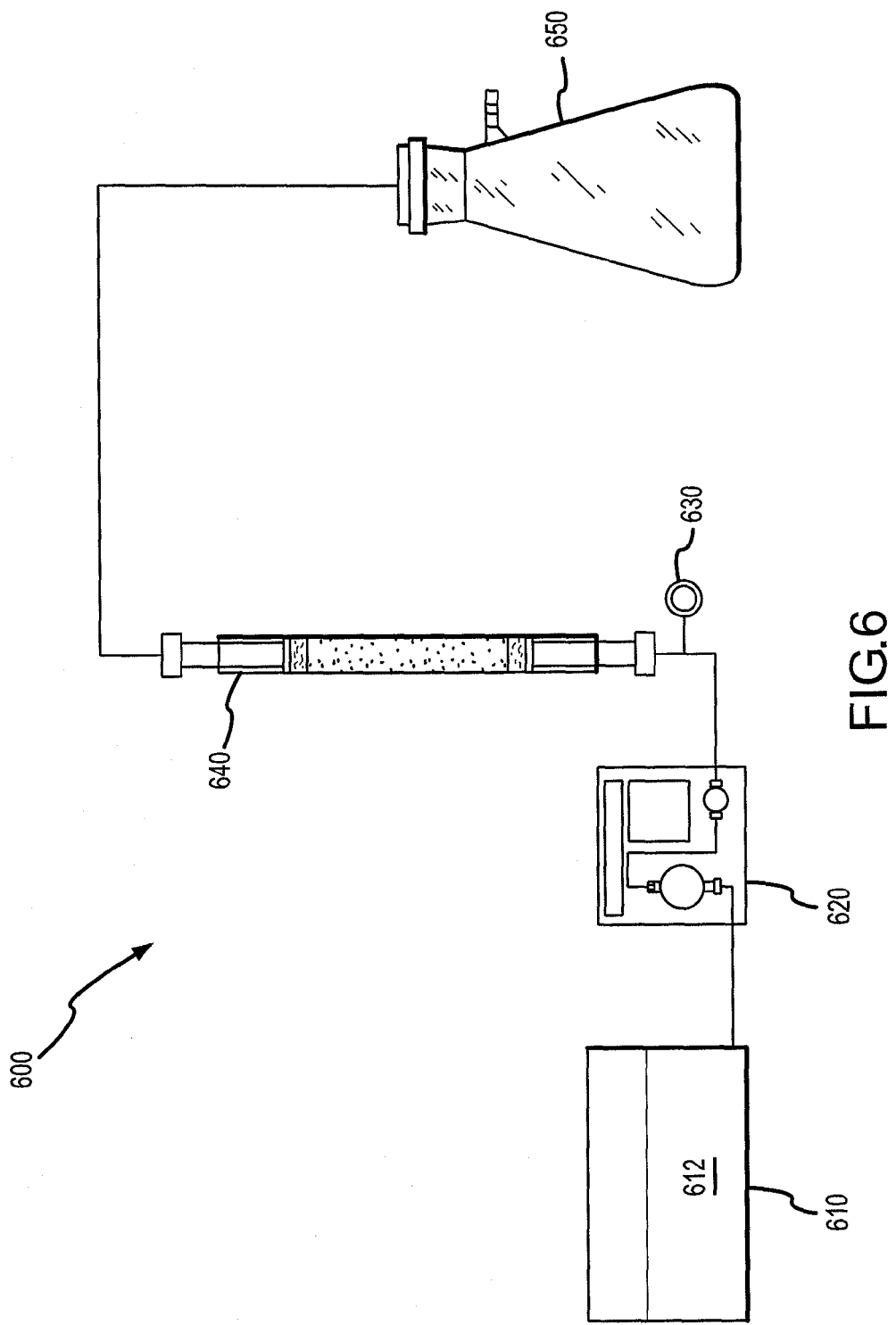
FIG. 6 is a schematic illustration of a test column configuration.
Figure 7A:
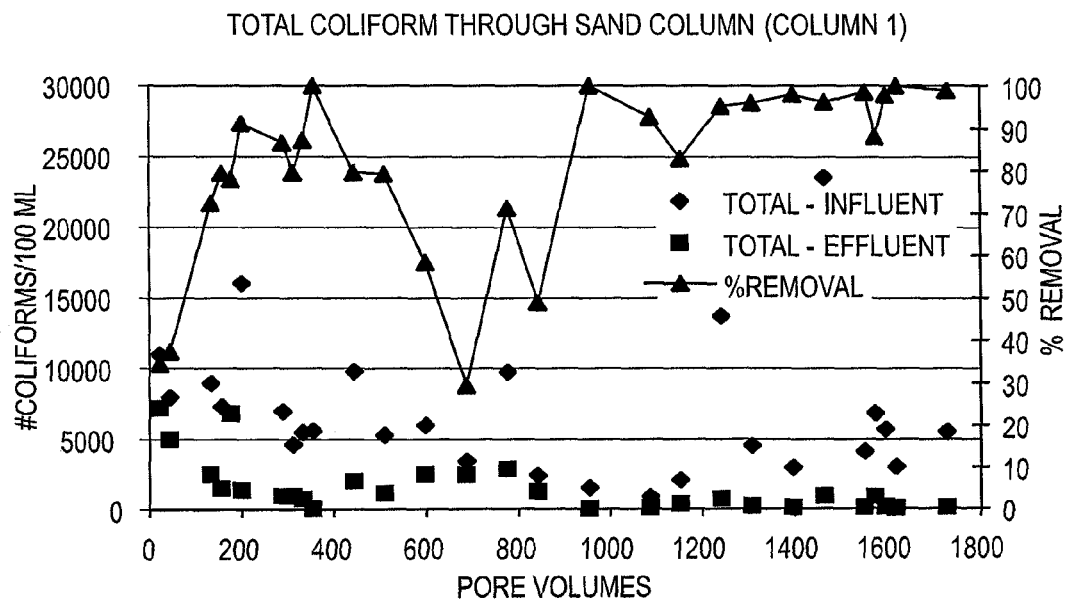
FIGS. 7a-7j illustrate experimental data associated with the testing of various columns comprising natural filtration media.
Figure 7B:
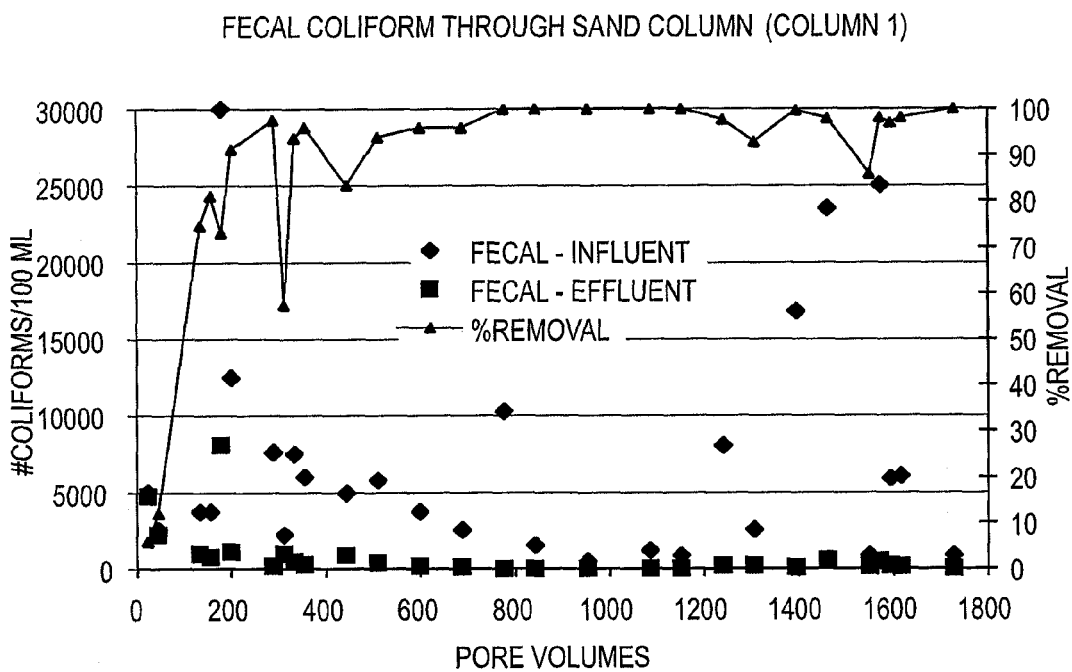
Figure 7C:
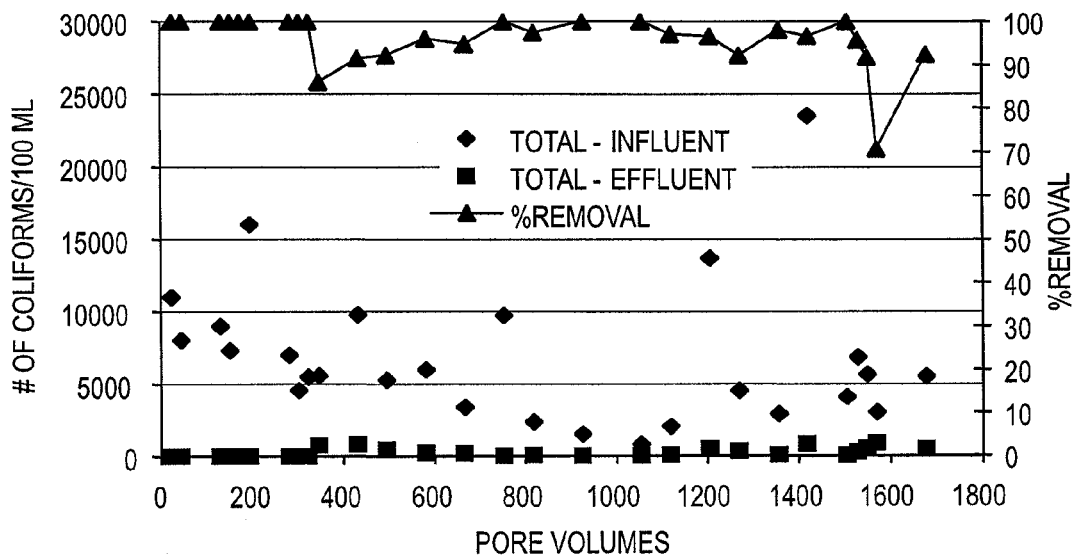
Figure 7D:
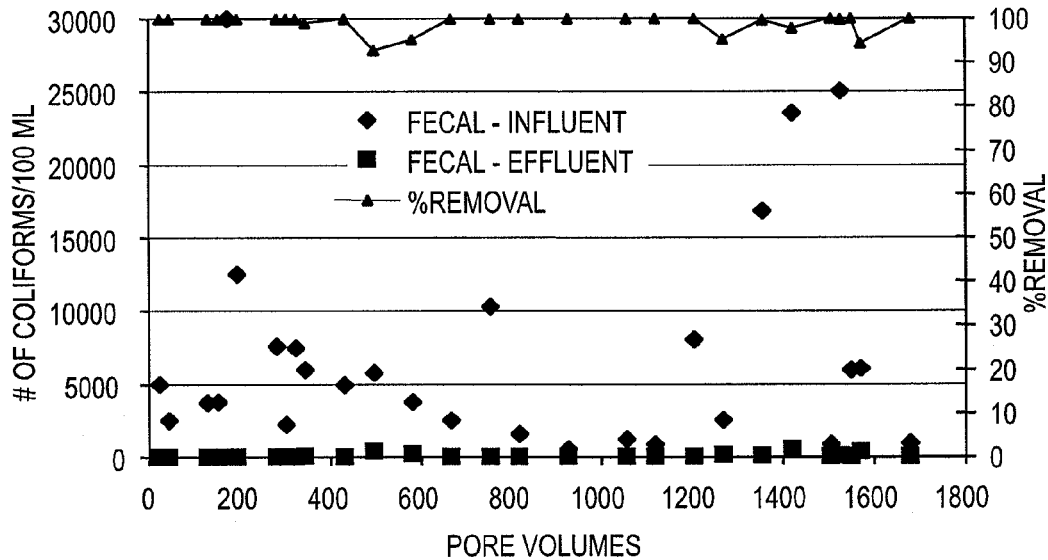
Figure 7E:
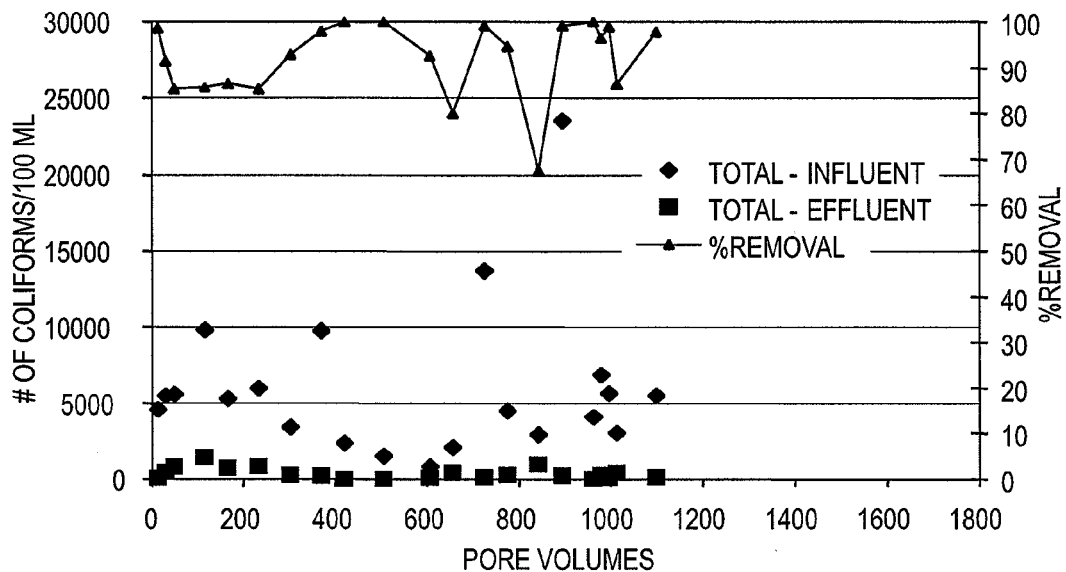
Figure 7F:
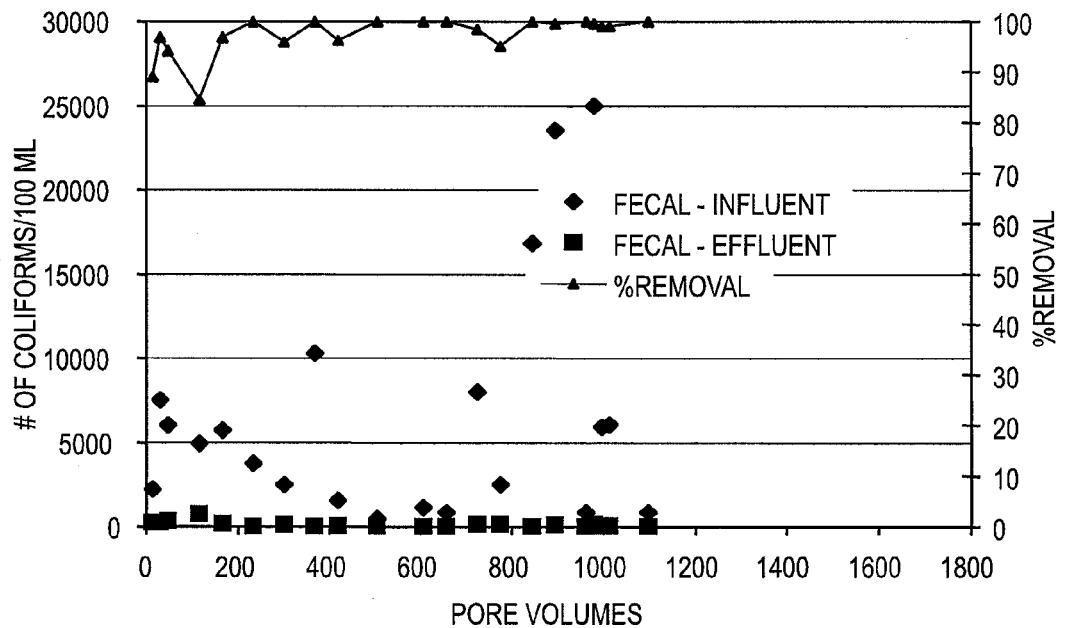
Figure 7G:
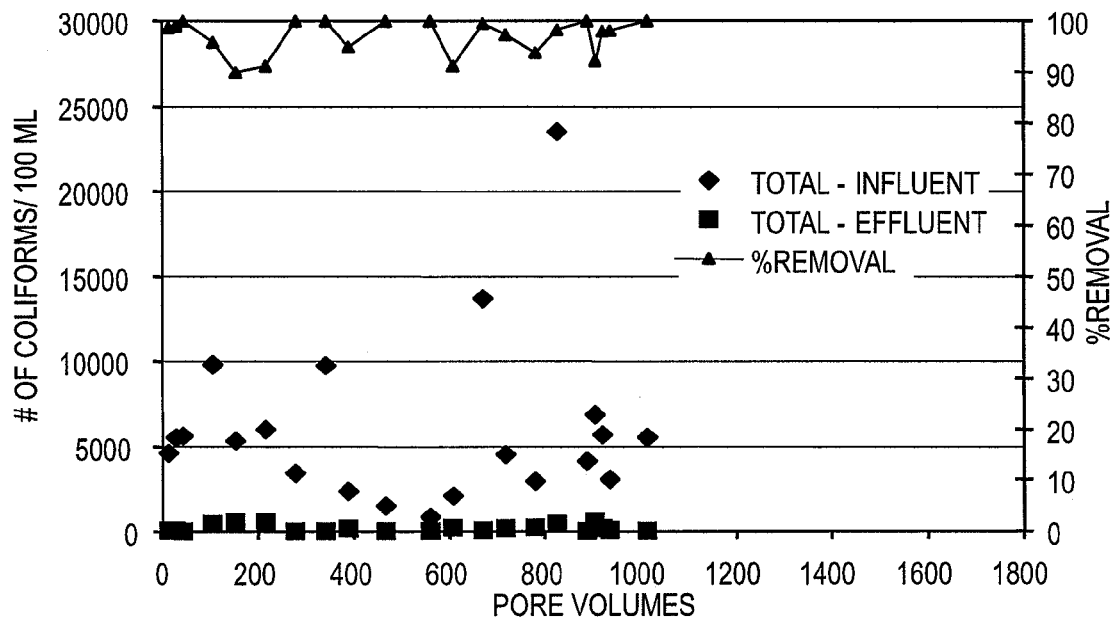
Figure 7H:
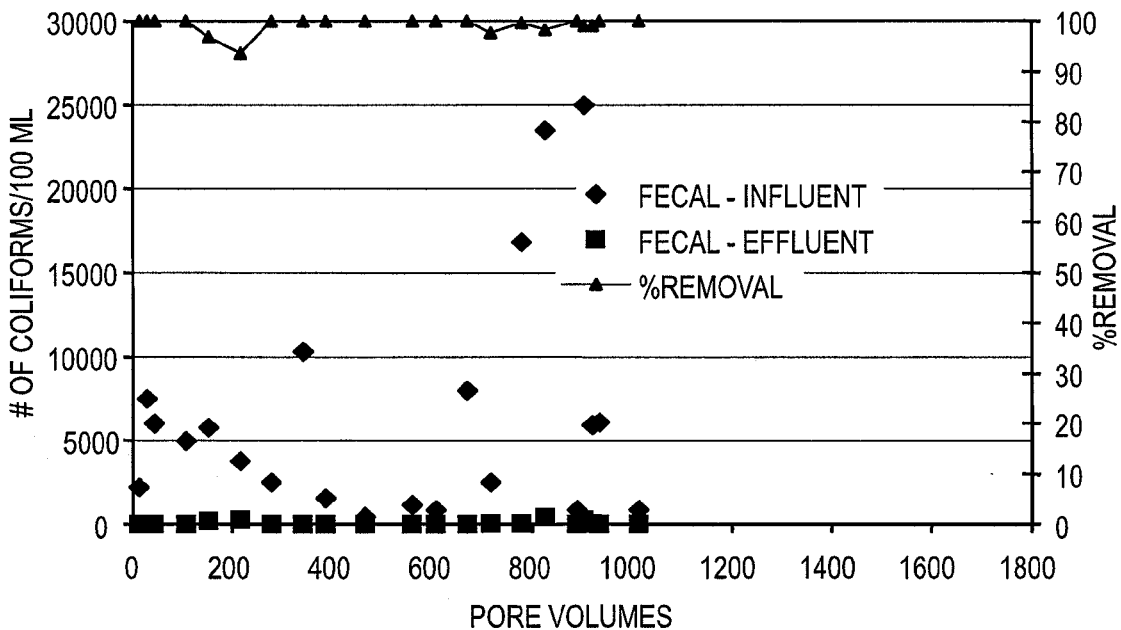
Figure 7I:
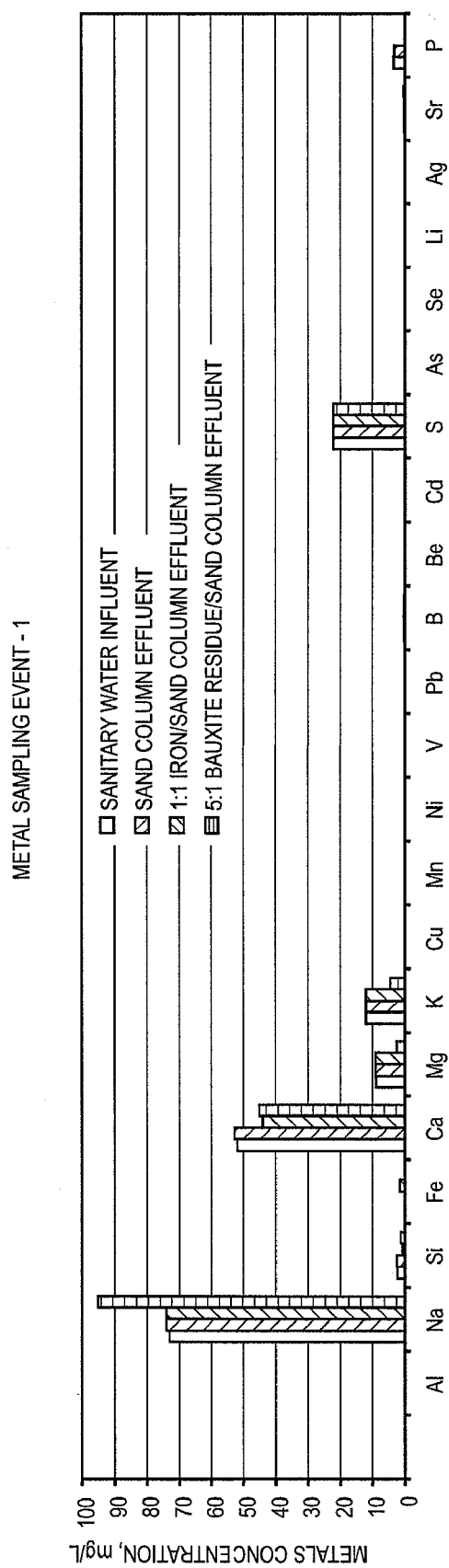
Figure 7J:
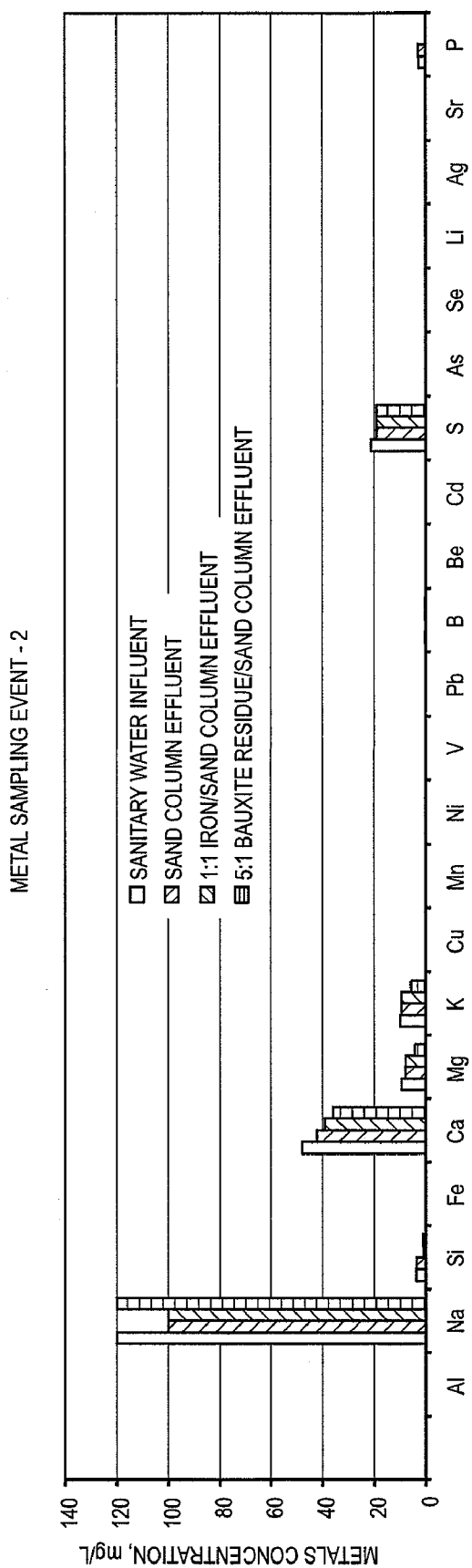

As schematically illustrated in FIG. 6, sanitary wastewater 612 from a reservoir 610 was flowed through a column 640 comprising a natural media filtration arrangement to an effluent reservoir 650 via a pump 620. A pressure gauge 630 was used to monitor the inlet pressure to the column 640. The column 640 was a 2.5 cm inner diameter PVC column comprising 30 cm in height of a natural media filtration arrangement surrounded by 2.5 cm in height glass wool filters on either side of the natural media filtration arrangement. Four different natural media arrangements were utilized:

a. Column 1—commercial filter sand
   b. Column 2—sand and iron filings in a 1:1 ratio, by volume
   c. Column 3—bauxite residue and sand in a 3:1 ratio, by volume
   d. Column 4—bauxite residue and sand in a 5:1 ratio, by volume Treated sanitary wastewater was passed through each column in an upflow mode at a flow rate of 1 mL/min, which corresponds to an empty bed contact time for each of the columns of 150 minutes. The influent and effluent of each column were monitored regularly for total and fecal coliform bacteria. The results of these tests are illustrated in FIGS. 7a-7j. During two different sampling events, 20 different inorganic compounds were analyzed in both the influent and effluents for all four columns. The test results of these sampling events are illustrated in FIGS. 7i-7j.

With respect to bacteria removal, Columns 2 and 4 were able to achieve an average percent reduction of 97+ percent in total coliform bacteria, and an average percent reduction of 99+ percent in fecal coliform bacteria, with the majority of the data being non-detect (detection limit=0 coliforms/100 mL). In many areas, the regulatory limit for fecal coliform is less than 260 coliforms/100 ml. The percentage reduction of coliform in Columns 1 and 3 indicates that the amount of iron in the sand/bauxite residue may play a role in the removal of coliform.

With respect to the two sampling events, the results of which are illustrated in FIGS. 7i-7j, there were no significant differences in the profile scan for Columns 1 and 3. Columns 2 and 4 reduced Si by 56%, Ca by 20% and phosphorus (P) by 100%. Additionally, Column 4 reduced both Mg and K by 50%.

Compost Removal of PCBs and Aluminum

Figure 8:
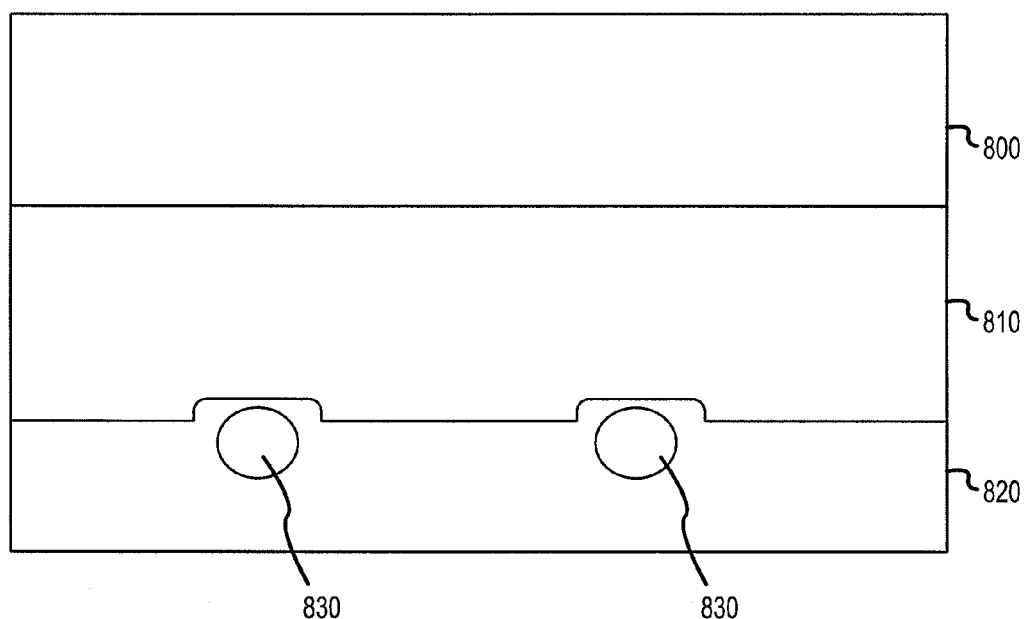
FIG. 8 is a schematic illustration of a compost bed employed in treating industrial wastewater.
Figure 9:
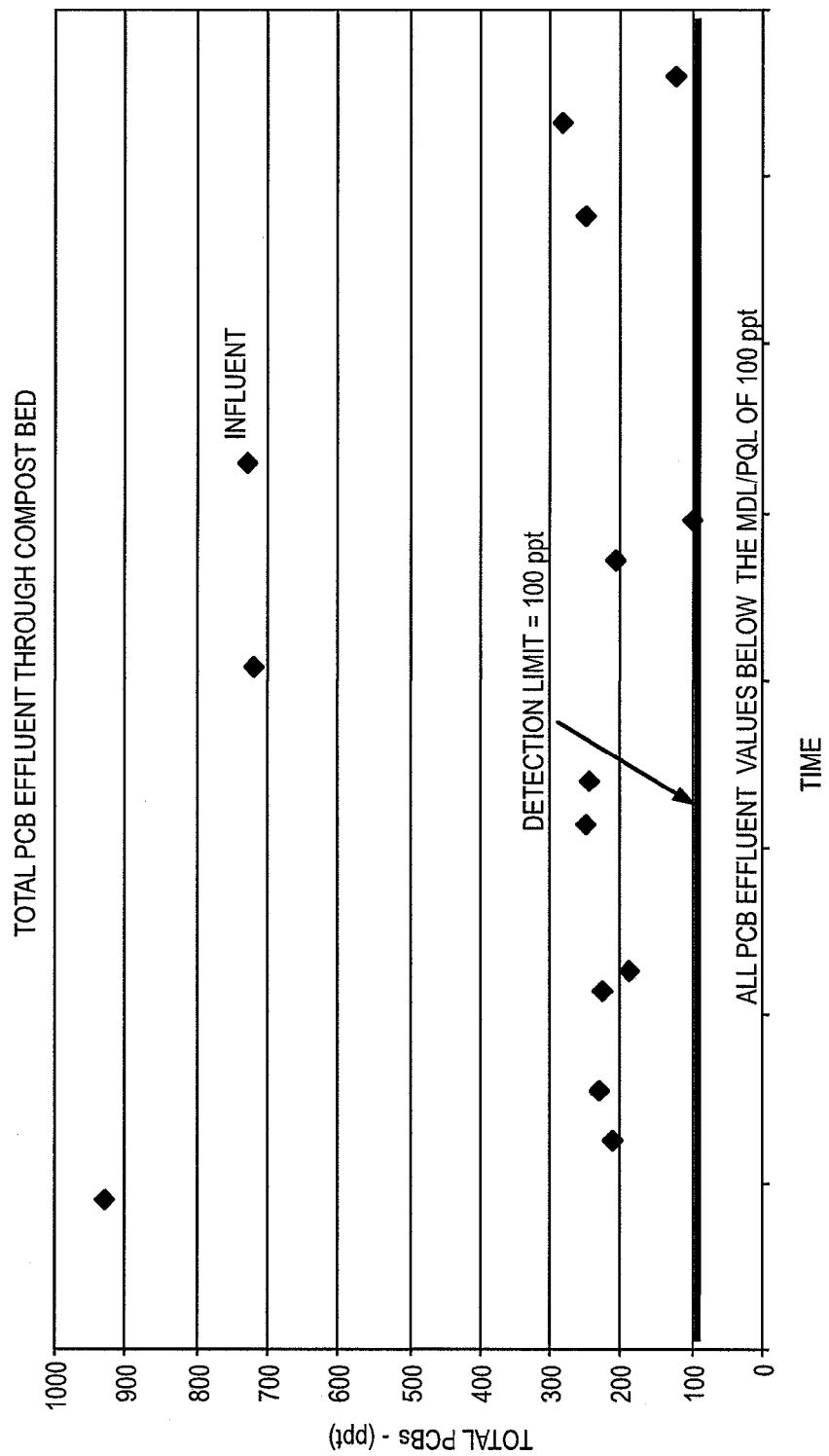
FIG. 9 illustrates experimental data associated with the use of a compost bed to treat industrial wastewater.

A full-scale compost-based bed was constructed, a schematic view of which is illustrated in FIG. 8. The bed included an aggregate base layer 820 having a height of about 9 centimeters and included drainage pipes 830 fluidly interconnected therewith. A compost layer 810 having a height of about 60 centimeters was provided on top of the base layer. A freeboard layer 800 was included above the compost layer 810. The bed was designed to satisfy a hydraulic loading of from 0.01 to 0.1 gallons per minute per square foot (0.4 to 40.7 lpm/m$^2$) and a residence time of from 2.5 to 24 hours. Wastewaters from an industrial facility were passed through the bed at a rate of between about 70,000 and 400,000 gallons per day (about 265,000 and 1,520,000 liters per day) for a period of several months. The total suspended solids of the influent was not greater than 10 ppm, and the total suspended solids particle range was from 0.5 to 10 μm. Effluent water from the compost bed was periodically tested for PCBs and aluminum. The test results for PCBs are illustrated in FIG. 9. For the tested effluent samples, between 70-100% of aluminum was removed from the wastewater, with the majority of the tested effluent samples measuring non-detect for aluminum at a detection limit of 0.05 mg/L. All effluent samples were non-detect for PCBs at a detection limit of 0.0001 mg/L (0.1 ppb).

Compost Removal of Chlorine

Cooling water containing chlorine (from municipal water) was treated using a vertical flow cell. The cell include a top bed of compost having height of about 55 centimeters, a volume of about 0.72 cubic meters and a cross-sectional area of about 1.3 square meters. The cell included a bottom bed of aggregate having a height of about 15 centimeters, a volume of about 0.2 cubic meters, and a cross-sectional area of about 1.3 square meters. After a residence time of 24 hours, total residual chlorine was reduced from an initial concentration of 1-2 mg/L to a concentration of <0.02 to about 0.05 mg/L, with no free chlorine detected in the effluent at the 0.02 mg/L analytical detection level.

Herbicides/Pesticides Removal Using Compost

To test the effectiveness of compost in removing herbicides/pesticides from water, tests were conducted using the popular herbicide ingredient atrazine. An atrazine stock solution comprising 1 g/ml of atrazine was prepared and a series of isotherm equilibrium tests were performed using grow green compost. Compost showed significant removal of atrazine from stock solution. As shown in Table 3, below, atrazine was reduced from approximately 1 to 0.06 mg/l at the highest dose (i.e., 10 g compost per 100 milliliters of atrazine solution).

TABLE 3

| Compost dose (g/100 ml) | Mixture pH | Filtrate atrazine concentration (mg/L) |
|---|---|---|
| 0.01 | 5.68 | 0.87 |
| 0.1 | 5.8 | 0.89 |
| 1 | 6.35 | 0.3 |
| 10 | 6.85 | 0.06 |

Fluoride Removal via Bauxite Residue

Simple batch adsorption studies were performed to assess the ability of bauxite residue to remove fluorides from wastewater. 250 mL glass vials containing varying dosage of sorbents from 25 g/L to 100 g/L were produced. The sorbate included between 64-73 mg/L dissolved fluorine from a wastewater with a high concentration of sulfate. Studies were conducted for 4 days and data was acquired after 2 hours, 24 hours and 96 hours. Fluoride removal increased from 35% to 82% as the sorbent loading was increased from 25 g/L to 100 g/L. The sorbate loading ranged from 1-2 mg of fluoride per g of bed at the end of 24 hours.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A wastewater treatment system comprising:
    a vessel comprising a bed for polishing a wastewater stream comprising a plurality of contaminants, the bed including iron filings, bauxite residue, and aggregate selected from the group consisting of sand, gravel, and combinations thereof;
    wherein the iron filings, aggregate, and bauxite residue are commingled within the vessel;
    wherein the bauxite residue to aggregate ratio is at least 2:1 and wherein the iron filings to aggregate ratio is at least 1:5;
    a wastewater inlet of the vessel in fluid communication with the bed; and
    a wastewater outlet of the vessel in fluid communication with the bed.

2. The wastewater treatment system of claim 1, wherein the vessel further comprises:
    at least one other natural media filtration agent selected from the group consisting of compost, granular activated carbon, and bone char.

3. The wastewater treatment system of claim 1, wherein the vessel is one of an in-ground pit, an above-ground tank, and a combination thereof.

4. The wastewater treatment system of claim 1, wherein the bauxite residue comprises:
    alumina, silica and iron oxide.

5. The wastewater treatment system of claim 1, wherein the iron filings comprise zero valent iron.

6. The wastewater treatment system of claim 1, wherein the iron filings are selected from the group consisting of a ribbon form, a particulate form, and combinations thereof.

* * * * *